US012805529B2

(12) United States Patent
Kojima

(10) Patent No.: US 12,805,529 B2
(45) Date of Patent: Nov. 24, 2026

(54) PLANT GROWTH PROMOTER PRODUCTION METHOD, PLANT GROWTH PROMOTER, AND PLANT GROWTH PROMOTING METHOD

(71) Applicant: Panasonic Intellectual Property Management Co., Ltd., Osaka (JP)

(72) Inventor: Seiji Kojima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1140 days.

(21) Appl. No.: 17/845,022

(22) Filed: Jun. 21, 2022

(65) Prior Publication Data

US 2022/0322679 A1 Oct. 13, 2022

Related U.S. Application Data

(63) Continuation of application No. PCT/JP2020/047573, filed on Dec. 18, 2020.

(30) Foreign Application Priority Data

Dec. 23, 2019 (JP) ................................ 2019-231897

(51) Int. Cl.

*A01N 63/20* (2020.01)
*A01P 21/00* (2006.01)
*C12N 1/32* (2006.01)
*C12N 15/09* (2006.01)

(52) U.S. Cl.

CPC .............. *A01N 63/20* (2020.01); *A01P 21/00* (2021.08)

(58) Field of Classification Search

CPC ......... A01N 63/00; A01P 21/00; C12N 15/09; C12N 1/34

See application file for complete search history.

(56) References Cited

U.S. PATENT DOCUMENTS

| | | | | |
|---|---|---|---|---|
| 4,551,164 | A | 11/1985 | Tenzer | |
| 5,539,092 | A * | 7/1996 | Haselkorn .......... | C12N 15/8274 536/23.6 |
| 2013/0102465 | A1 | 4/2013 | Lovatt | |
| 2014/0342905 | A1 | 11/2014 | Bullis et al. | |
| 2017/0159084 | A1 | 6/2017 | Kawahara et al. | |
| 2022/0275033 | A1 | 9/2022 | Kojima | |
| 2022/0293990 | A1 | 9/2022 | Kusama et al. | |
| 2022/0325312 | A1 | 10/2022 | Kojima | |

FOREIGN PATENT DOCUMENTS

| | | |
|---|---|---|
| JP | 63-501286 | 5/1988 |
| JP | 6-16519 | 1/1994 |
| JP | 11-335191 | 12/1999 |
| JP | 3143872 | 3/2001 |
| JP | 2006-124186 | 5/2006 |
| JP | 2014-73993 | 4/2014 |
| JP | 5943844 | 7/2016 |
| JP | 2018-11600 | 1/2018 |
| JP | 6341676 | 6/2018 |
| WO | 87/02659 | 5/1987 |
| WO | 2011/090726 | 7/2011 |
| WO | 2021/100640 | 5/2021 |
| WO | 2021/100642 | 5/2021 |
| WO | 2021/100643 | 5/2021 |

OTHER PUBLICATIONS

Office Action issued Mar. 14, 2025 in Chinese Patent Application No. 202080088174.1, with English-language Translation.
Kaneko, T et al., "slr1841[Synechocystissp.PCC6803]", NCBI, Accession No. BAA17449.1, Oct. 7, 2016.
Kaneko, T et al., "slr0688[Synechocystissp.PCC6803]", NCBI, Accession No. BAA16977.1, Oct. 7, 2016.
Extended European Search Report issued Aug. 22, 2023 in corresponding European Patent Application No. 20905193.7.
International Search Report (ISR) issued on Feb. 9, 2021 in International (PCT) Application No. PCT/JP2020/047573.
Alejandro Jiménez-Gómez, et al., "Probiotic activities of *Rhizobium laguerreae* on growth and quality of spinach", Scientific Reports, vol. 8, Article No. 295, pp. 1-10, 2018.
Jie Zhou et al., "Discovery of a super-strong promoter enables efficient production of heterologous proteins in cyanobacteria", Scientific Reports, Nature Research, vol. 4, Article No. 4500, pp. 1-6, 2014.
Uwe J. Jürgens et al., "Polysaccharide Covalently Linked to the Peptidoglycan of the Cyanobacterium *Synechocystis* sp. Strain PCC6714", Journal of Bacteriology, vol. 168, No. 2, pp. 568-573, 1986.
Seiji Kojima et al., "Peptidoglycan-associated outer membrane protein Mep45 of rumen anaerobe *Selenomonas ruminantium* forms a non-specific diffusion pore via its C-terminal transmembrane domain", Bioscience, Biotechnology, and Biochemistry, vol. 80, No. 10, pp. 1954-1959, 2016.
Hikaru Kowata et al., "Outer Membrane Permeability of Cyanobacterium *Synechocystis* sp. Strain PCC 6803: Studies of Passive Diffusion of Small Organic Nutrients Reveal the Absence of Classical Porins and Intrinsically Low Permeability", Journal of Bacteriology, vol. 199, Issue 19, e00371-17, pp. 1-11, Oct. 2017.
Seiji Kojima et al., "Outer Membrane Proteins Derived from Non-cyanobacterial Lineage Cover the Peptidoglycan of *Cyanophora paradoxa* Cyanelles and Serve as a Cyanelle Diffusion Channel", Journal of Biological Chemistry, vol. 291, No. 38, p. 20198-20209, Sep. 2016.
Stéphane Mesnage et al., "Bacterial SLH domain proteins are non-covalently anchored to the cell surface via a conserved mechanism involving wall polysaccharide pyruvylation", The EMBO Journal, vol. 19, No. 17, pp. 4473-4484, 2000.
Lun Yao et al., "Multiple Gene Repression in Cyanobacteria Using CRISPRi", ACS Synthetic Biology, vol. 5, pp. 207-212, 2016.

(Continued)

*Primary Examiner* — Maryam Monshipouri
(74) *Attorney, Agent, or Firm* — Wenderoth, Lind & Ponack, L.L.P.

(57) ABSTRACT

A plant growth promoter production method includes: preparing a modified cyanobacterium in which a function of a protein involved in binding between an outer membrane and a cell wall of cyanobacterium is suppressed or lost; and causing the modified cyanobacteria to secrete a secretion involved in promoting growth of a plant.

2 Claims, 11 Drawing Sheets

Specification includes a Sequence Listing.

(56) References Cited

OTHER PUBLICATIONS

Hikaru Kowata, "Studies on molecular basis of cyanobacterial outer membrane function and evolutionary relationship with primitive chloroplasts", Dissertation, Tohoku University, Mar. 27, 2018, cited in the ISR.

Paulo Oliveira et al., "The versatile TolC-like Slr1270 in the cyanobacterium *Synechocystis* sp. PCC 6803", Environmental Microbiology, vol. 18, No. 2, pp. 486-502, 2016, cited in ISR.

Seiji Kojima and Yasuaki Okumura, "Outer membrane-deprived cyanobacteria liberate periplasmic and thylakoid luminal components that support the growth of heterotrophs", bioRxiv, [online], Mar. 25, 2020, [retrieved on Feb. 1, 2021], Internet https://doi.org/10.1101/2020.03.24.006684, cited in ISR.

* cited by examiner

FIG. 10

| | Added component | Photograph | Total leaf length | Dry weight of shoot |
|---|---|---|---|---|
| Example 3 | Modified cyanobacterium secretion | 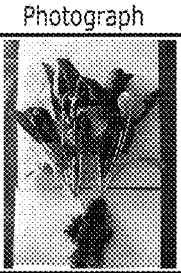 | 1.31 +/- 0.12 (n = 13) | 1.53 +/- 0.26 (n = 13) |
| Comparative Example 2 | Water | 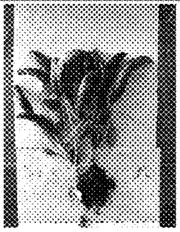 | 1 | 1 |
| Comparative Example 3 | Medium for cyanobacterium | 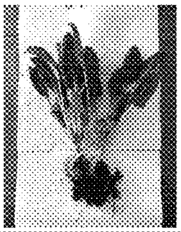 | 1.03 +/- 0.27 (n = 6) | 0.89 +/- 0.20 (n = 6) |
| Comparative Example 4 | Culture supernatant of parent cyanobacterium | 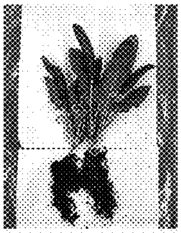 | 0.86 +/- 0.09 (n = 4) | 0.90 +/- 0.02 (n = 4) |
| Comparative Example 5 | Hot water extract of parent cyanobacterium | 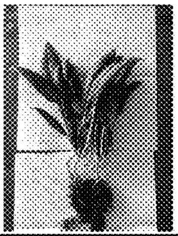 | 1.12 +/- 0.15 (n = 5) | 0.95 +/- 0.17 (n = 5) |
| Comparative Example 6 | Chemical fertilizer (N:P:K = 6:10:5) | 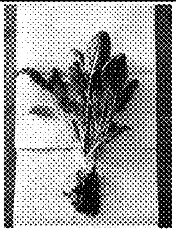 | 0.99 +/- 0.06 (n = 6) | 1.10 +/- 0.16 (n = 6) |
| Comparative Example 7 | Organic fertilizer | 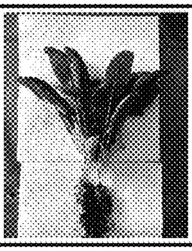 | 0.94 +/- 0.07 (n = 6) | 0.98 +/- 0.10 (n = 6) |

FIG. 11
| | | After cultivation for 40 days | | | After cultivation for 60 days | | |
|---|---|---|---|---|---|---|---|
| | Added component | Photograph | The number of flowers | The number of buds | Photograph | The number of flowers | The number of buds |
| Example 4 | Modified cyanobacterium secretion | 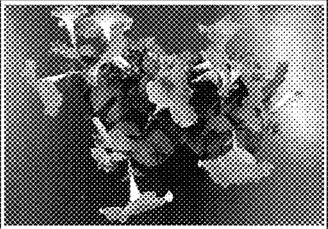 | 6.3 +/- 2.5 (n = 3) | 8.7 +/- 0.6 (n = 3) | 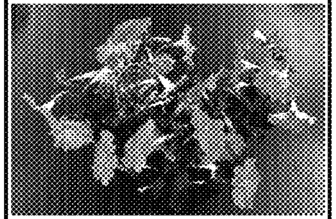 | 17.3 +/- 3.1 (n = 3) | 17.6 +/- 3.8 (n = 3) |
| Comparative Example 8 | Chemical fertilizer (N:P:K = 6:10:5) | 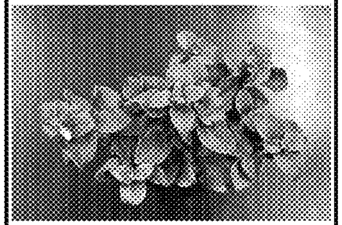 | 0 | 2.7 +/- 3.8 (n = 3) | 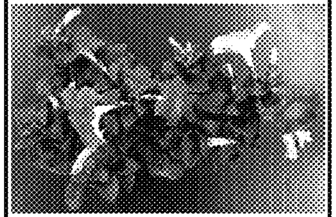 | 5.7 +/- 5.1 (n = 3) | 11.7 +/- 3.1 (n = 3) |

FIG. 14
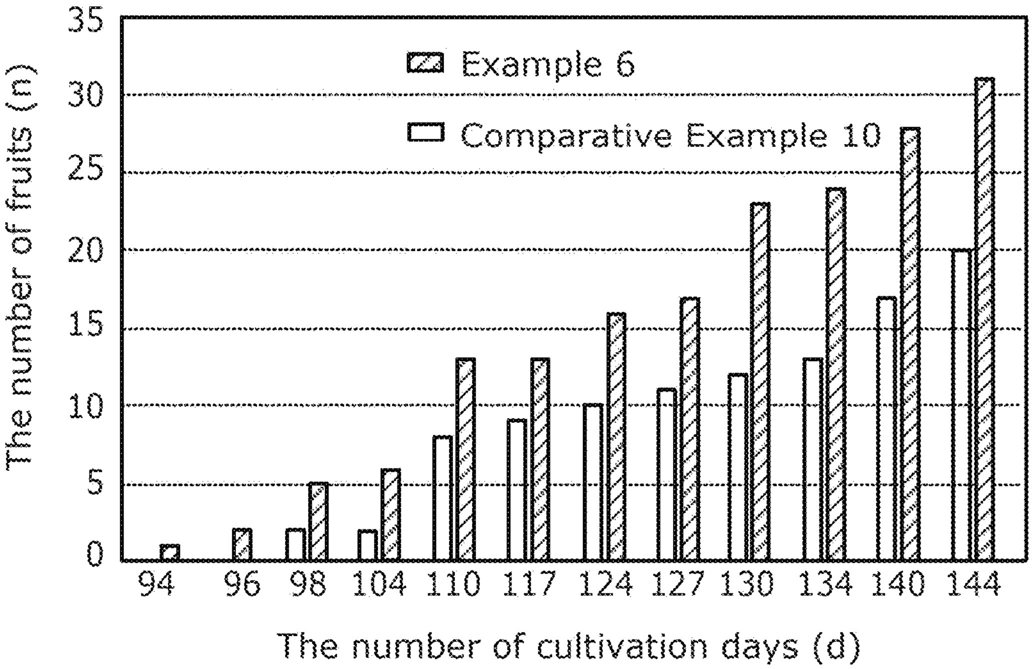
FIG. 15
| | After cultivation for 110 days |
|---|---|
| Example 6 |  |
| Comparative Example 10 |  |

FIG. 16
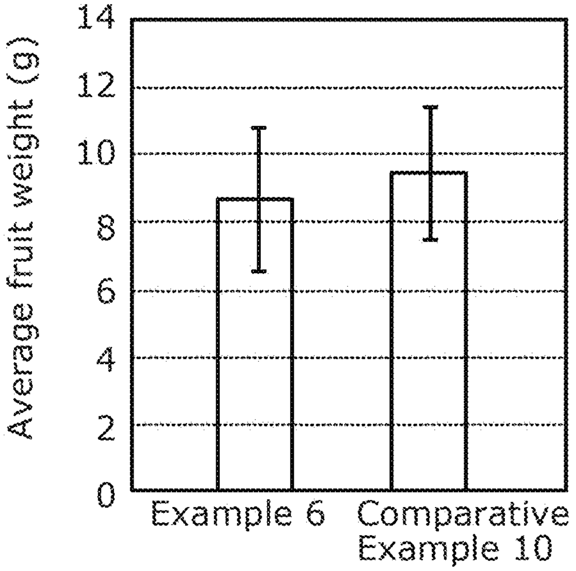
FIG. 17
| | After cultivation for 34 days |
| --- | --- |
| Example 7 | 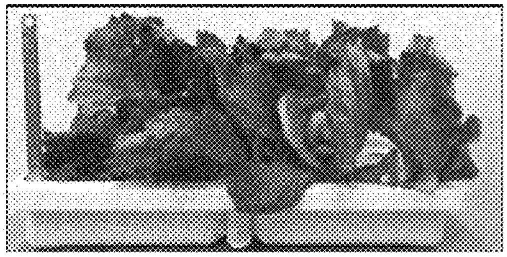 |
| Comparative Example 11 | 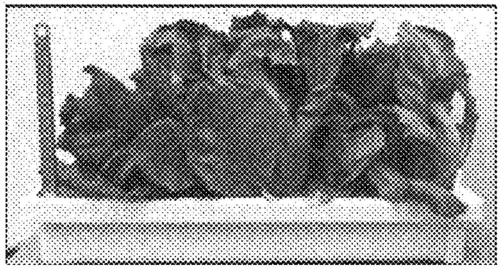 |

SEQUENCE LISTING

```
<160> NUMBER OF SEQ ID NOS: 22

<210> SEQ ID NO 1
<211> LENGTH: 630
<212> TYPE: PRT
<213> ORGANISM: Synechocystis PCC6803

<400> SEQUENCE: 1

Met Leu Lys Leu Ser Trp Lys Ser Leu Leu Val Ser Pro Ala Val Ile
1               5                   10                  15

Gly Ala Ala Leu Val Ala Gly Ala Ala Ser Ala Ala Pro Asp Asn Val
            20                  25                  30

Thr Asn Ala Gln Val Leu Asp Gln Leu Asp Gln Tyr Thr Ala Glu Gly
        35                  40                  45

Gln Ser Ser Ala Ile Asp Gln Val Thr Ser Val Ser Glu Leu Arg Asp
    50                  55                  60

Val Gln Pro Thr Ala Trp Ala Tyr Glu Ala Leu Lys Ser Leu Val Glu
65                  70                  75                  80

Arg Tyr Gly Cys Ile Val Gly Tyr Pro Asp Arg Thr Phe Arg Gly Asp
                85                  90                  95

Arg Ala Leu Ser Arg Trp Glu Phe Ala Ala Gly Leu Asn Ala Cys Met
            100                 105                 110

Asn Val Met Glu Arg Leu Ile Gln Glu Asn Val Ala Val Leu Arg Glu
        115                 120                 125

Asp Ile Asp Lys Leu Lys Arg Leu Met Gln Glu Phe Glu Ala Glu Leu
    130                 135                 140

Ala Ala Leu Gly Ala Arg Val Asp Asn Leu Glu Ala Arg Thr Ser Phe
145                 150                 155                 160

Leu Glu Asp His Gln Phe Ser Thr Thr Thr Lys Leu Thr Gly Glu Val
                165                 170                 175
```

```
Ile Phe Ala Pro Thr Ala Ile Phe Gly Thr Lys Lys Thr Leu Asn Asn
            180                 185                 190

Gln Thr Asp Asn Asn Gln Ala Val Phe Gln Asn Arg Val Arg Leu Gln
        195                 200                 205

Phe Asn Thr Ser Phe Ser Gly Glu Asp Leu Leu Val Thr Arg Leu Ala
    210                 215                 220

Ala Gly Asn Gly Asn Arg Phe Lys Ser Phe Tyr Pro Thr Gln Asn Val
225                 230                 235                 240

Ile Asp Pro Glu Thr Gly Asn Pro Ile Gly Ile Val Gly Asp Tyr Tyr
                245                 250                 255

Glu Ser Pro Thr Phe Thr Gln Val His Gln Leu Ser Pro Gly Asp Asn
            260                 265                 270

Asn Asn Val Ala Val Asp Trp Leu Ala Tyr Tyr Val Pro Leu Asp Leu
        275                 280                 285

Gly Glu Asn Phe Arg Leu Asn Asn Tyr Ile Ala Ala Trp Gly Gly Ile
    290                 295                 300

Trp Asp Asp Phe Val Pro Thr Leu Asn Pro Tyr Phe Asp Asp Tyr Thr
305                 310                 315                 320

Gly Gly Lys Gly Ser Leu Ser Gln Phe Thr Ala Gln Asn Pro Ile Tyr
                325                 330                 335

Ser Ile Gly Gly Gly Thr Gly Ile Gly Thr Ser Leu Glu Leu Gly Phe
            340                 345                 350

Leu Ser Asn Leu Leu Gly Pro Thr Ser Leu Ser Leu Gly Tyr Leu Ala
        355                 360                 365

Ser Thr Gly Asn Asn Pro Ser Ser Gly Gly Ser Val Thr Asn Pro Ala
    370                 375                 380

Thr Gly Asn Asn Tyr Asp Phe Ser Ser Gly Gly Asn Gly Leu Phe Asn
385                 390                 395                 400

Gly Gly Tyr Ser Ala Leu Ala Gln Ile Thr Thr Asn Ile Phe Asp Arg
                405                 410                 415

Val Ser Leu Gly Phe Thr Tyr Val Asn Ala Tyr Thr Thr Pro Asp Ala
            420                 425                 430

Ala Ile Phe Gly Lys Gly Gly Thr Gln Gly Ile Val Gly Thr Thr Ala
        435                 440                 445

Ala Asn Leu Asn Arg Ser Glu Leu Asn Asp Asp Phe Val Asn Gly Leu
    450                 455                 460

Gly Val Gly Ala Pro Pro Val Asp Ala Ala Thr Tyr Asn Asn Asn Val
465                 470                 475                 480

Ser Gly Gly Ser Thr Ser Gly Asn Val Ile Asn Pro Tyr Asp Phe Gly
                485                 490                 495

Gly Lys Gln Thr Asn Ser Tyr Gly Val Gln Met Ala Trp Asn Ile Ala
            500                 505                 510

Asp Trp Leu Ser Phe Ser Ala Tyr Gly Ser Tyr Thr Asn Val Thr Leu
        515                 520                 525

Ile Gly Lys Asp Asn Gly Asp Ile Trp Thr Tyr Gly Gly Gly Phe Ala
    530                 535                 540

Phe Pro Asp Leu Gly Lys Glu Gly Asn Val Leu Gly Ile Phe Ala Gly
545                 550                 555                 560

Val Gln Pro Tyr Val Ser Gly Phe Thr Asn Asn Thr Leu Gly Thr Thr
                565                 570                 575

Phe Val Thr Thr Ala Asn Pro Leu Gln Val Glu Leu Phe Tyr Lys Tyr
            580                 585                 590
```

Gln Leu Thr Asp Asn Leu Ser Ile Thr Pro Gly Val Ile Trp Ile Ser
595 600 605

Lys Pro Glu Gln Thr Thr Asn Ala Thr Asp Ala Phe Ile Gly Thr Val
610 615 620

Arg Gly Thr Phe Thr Phe
625 630

<210> SEQ ID NO 2
<211> LENGTH: 532
<212> TYPE: PRT
<213> ORGANISM: Synechococcus sp. NIES-970

<400> SEQUENCE: 2

Met Ser Lys Ala Met Arg Asn Leu Leu Ser Gly Ala Thr Val Ala Leu
1 5 10 15

Gly Ala Thr Val Ala Phe Ser Gly Ala Ala Ile Ala Glu Glu Asn Gln
20 25 30

Ala Val Leu Asp Gln Ile Ser Gln Tyr Ser Thr Asp Asn Ser Val Ala
35 40 45

Gln Val Asn Ser Val Phe Gln Leu Ser Asp Val Ser Pro Ser Asp Trp
50 55 60

Ala Phe Asp Ala Leu Arg Asn Leu Val Glu Asn Tyr Asn Cys Ile Val
65 70 75 80

Gly Tyr Pro Asp Gly Thr Phe Arg Gly Thr Arg Pro Leu Ser Arg Tyr
85 90 95

Glu Phe Ala Ala Gly Leu Asn Ala Cys Leu Gln Gln Ile Glu Arg Met
100 105 110

Leu Glu Gly Gly Gly Glu Val Thr Gln Glu Asp Leu Ala Ala Leu Arg
115 120 125

Arg Leu Leu Asn Glu Phe Glu Ala Glu Leu Ala Thr Leu Gly Ala Arg
130 135 140

Val Asp Asp Leu Asp Gly Arg Val Glu Phe Leu Glu Asp Asn Gln Phe
145 150 155 160

Ser Thr Thr Thr Lys Leu Asn Gly Glu Val Ile Phe Asn Leu Gly Gly
165 170 175

Ala Phe Gly Asp Ser Arg Ala Asp Gly Pro Gly Pro Ile Asp Asp Glu
180 185 190

Phe Thr Phe Ser Asn Arg Val Arg Leu Asn Leu Asp Thr Ser Phe Thr
195 200 205

Gly Arg Asp Arg Leu Arg Thr Arg Leu Glu Ala Gly Asn Ile Thr Arg
210 215 220

Leu Asp Arg Ala Thr Gly Val Asp Ala Ala Arg Leu Gly Phe Asp Thr
225 230 235 240

Asn Asn Gly Asn Asp Val Glu Ile Gly Lys Leu Phe Tyr Arg Phe Pro
245 250 255

Val Gly Asp Asn Ile Thr Ala Tyr Val Gly Ala Val Gly Leu Gly Leu
260 265 270

Asp Asp Ile Phe Asp Val Thr Asn Pro Tyr Phe Glu Ser Ser Gly Asn
275 280 285

Gly Ala Leu Ser Arg Phe Gly Arg Phe Asn Pro Ile Tyr Arg Gly Pro
290 295 300

Asp Gly Ala Gly Ala Gly Phe Asn Phe Asp Leu Gly Glu Arg Val Thr
305 310 315 320

Phe Ser Ala Ala Tyr Leu Ala Asp Asp Gly Gly Ala Ser Ser Pro Val
325 330 335

```
Ser Lys Asn Gly Leu Phe Asn Gly Asn Tyr Thr Ala Gly Ala Gln Leu
            340                 345                 350

Asp Phe Ala Pro Ser Asp Asn Ile Met Leu Ser Ala Val Tyr Thr Arg
        355                 360                 365

Arg Tyr Gln Gln Gly Gly Asp Val Asn Leu Ser Gly Ser Thr Gly Ser
    370                 375                 380

Asp Phe Ala Ala Asp Pro Phe Gly Phe Ala Ala Ser Ser Asn Asn Phe
385                 390                 395                 400

Gly Leu Gln Gly Ser Trp Leu Ile Gly Glu Lys Phe Asn Leu Gly Gly
                405                 410                 415

Trp Val Gly Tyr Thr Asn Ala Asp Leu Lys Asp Pro Val Val Thr Gly
            420                 425                 430

Asn Ala Asp Val Trp Asn Trp Ala Val Asn Ala Ala Leu Leu Asp Val
        435                 440                 445

Gly Gly Glu Gly Asn Thr Leu Gly Phe Ile Phe Gly Gln Pro Pro Lys
    450                 455                 460

Leu Thr Glu Ala Asp Ile Asp Phe Gly Gly Gly Pro Ile Thr Phe Asp
465                 470                 475                 480

Gly Ser Asp Ser Thr Tyr Leu Ala Glu Leu Gln Tyr Arg Tyr Lys Val
                485                 490                 495

Asn Asn Asn Ile Thr Ile Thr Pro Gly Ala Tyr Val Leu Trp Asn Pro
            500                 505                 510

Asn Gln Asn Asp Ala Asn Asp Thr Ile Val Val Gly Thr Val Arg Thr
        515                 520                 525

Thr Phe Ser Phe
    530


<210> SEQ ID NO 3
<211> LENGTH: 567
<212> TYPE: PRT
<213> ORGANISM: Anabaena cylindrica PCC 7122

<400> SEQUENCE: 3

Met Ser Asn Leu Leu Trp Lys Ser Leu Val Val Ser Pro Ala Val Leu
1               5                   10                  15

Gly Ala Ala Leu Leu Val Ser Gly Thr Ala Ile Ala Ser Pro Ala Ala
            20                  25                  30

Gly Asn Ser Ala Ser Asn Ala Ala Thr Glu Val Ser Ile Leu Glu Thr
        35                  40                  45

Gln Ala Ala Thr Glu Val Val Gln Gln Pro Val Val Leu Ala Gln Val
    50                  55                  60

Lys Gln Asp Thr Gln Val Leu Asp Gln Val Lys Arg Tyr Ser Asn Glu
65                  70                  75                  80

Gly Gln Asn Leu Gln Ser Gln Val Thr Ser Val Ser Gln Phe Ser Asp
                85                  90                  95

Val Gln Pro Thr Asp Trp Ala Phe Gln Ala Leu Gln Ser Leu Val Glu
            100                 105                 110

Arg Tyr Gly Cys Ile Ala Gly Tyr Pro Asn Gly Thr Tyr Arg Gly Asn
        115                 120                 125

Arg Ala Leu Thr Arg Tyr Glu Phe Ala Ala Gly Leu Asn Ala Cys Leu
    130                 135                 140

Asp Arg Val Asn Glu Leu Ile Ala Thr Ala Thr Ala Asp Met Val Thr
145                 150                 155                 160
```

```
Lys Gln Asp Leu Ala Thr Leu Gln Arg Leu Gln Glu Glu Phe Ser Ala
                165                 170                 175

Glu Leu Ala Thr Leu Arg Gly Arg Val Asp Ala Leu Glu Ala Arg Thr
            180                 185                 190

Ala Glu Leu Glu Ala Asn Gln Phe Ser Thr Thr Thr Lys Leu Gln Gly
        195                 200                 205

Glu Ala Ile Phe Ala Leu Thr Asp Ala Phe Asn Gly Asp Ile Ala Gly
    210                 215                 220

Lys Thr Val Phe Gln Asp Arg Val Arg Leu Asn Leu Gln Ser Ser Phe
225                 230                 235                 240

Thr Gly Arg Asp Met Leu Asn Thr Arg Leu Ala Ala Gly Asn Ala Gln
                245                 250                 255

Asn Phe Gly Asn Thr Gly Glu Ser Arg Gln Thr Phe Asp Val Gly Ser
            260                 265                 270

Thr Gly Thr Asn Asn Val Val Leu Asp Lys Leu Thr Tyr Glu Ala Pro
        275                 280                 285

Val Gly Pro Ala Gln Val Tyr Ile Ala Ala Thr Gly Gly Lys His Ser
    290                 295                 300

His Tyr Ala Ala Val Asn Asn Pro Tyr Phe Phe Asp Lys Thr Asp Gly
305                 310                 315                 320

Gly Asn Gly Ala Leu Ser Thr Phe Ser Ser Glu Asn Pro Ile Tyr Arg
                325                 330                 335

Ile Gly Gly Gly Ser Gly Ile Ala Leu Asn Val Pro Phe Gly Gln Gly
            340                 345                 350

Gly Gly Ile Leu Lys Pro Ser Ser Leu Thr Leu Gly Tyr Leu Ala Ser
        355                 360                 365

Glu Ala Asn Ser Pro Ala Ala Gly Glu Gly Leu Phe Asp Gly Asn Tyr
    370                 375                 380

Ala Ala Leu Gly Gln Leu Asn Phe Asn Val Gly Asn Arg Ile Ala Leu
385                 390                 395                 400

Ala Ala Thr Tyr Val His Gly Tyr His Gly Ala Ser Ser Arg Leu Phe
                405                 410                 415

Asp Ser Gly Glu Gly Asp Asp Ile Val Gly Thr Ser Leu Ala Asn Asn
            420                 425                 430

Leu Ser Leu Gly Ser Ala Ser Ser Ser Asn Ser Tyr Gly Val Ser Ala
        435                 440                 445

Ala Phe Arg Pro Ser Asp Lys Leu Ser Val Ser Gly Phe Val Ser Tyr
    450                 455                 460

His Asp Ile Thr Gly Phe Gly Ala Gly Asp Asp Tyr Glu Ala Trp Ser
465                 470                 475                 480

Tyr Gly Val Gly Val Ala Leu Pro Asp Phe Gly Lys Lys Gly Asn Val
                485                 490                 495

Leu Gly Ile Phe Gly Gly Ala Gln Pro Tyr Ser Phe Asn Asn Asn Gly
            500                 505                 510

Gly Ala Asn Ser Gly Asp Ile Pro Tyr Gln Val Glu Gly Phe Tyr Lys
        515                 520                 525

Tyr Arg Val Ser Asp Asn Ile Ser Val Thr Pro Gly Val Ile Trp Leu
    530                 535                 540

Pro Ser Ile Gly Gln Ser Ser Ser Ser Glu Asp Thr Phe Ile Gly Thr
545                 550                 555                 560

Leu Arg Thr Thr Phe Thr Phe
                565
```

<210> SEQ ID NO 4
<211> LENGTH: 300
<212> TYPE: PRT
<213> ORGANISM: Synechocystis PCC6803

<400> SEQUENCE: 4

```
Met Arg Val Ile Leu Cys Gly Tyr Tyr Gly Gln Asp Asn Ala Gly Asp
1               5                   10                  15

Glu Ala Leu Leu Val Cys Leu Leu Gln Met Leu Pro Ala Thr Val Glu
            20                  25                  30

Pro Val Val Leu Ser Ala Asn Pro Gln Val Thr Thr Ala Arg Tyr Gly
        35                  40                  45

Val Lys Ala His Tyr Asn Arg Asp Trp Gly Lys Ile Trp Gln Leu Leu
    50                  55                  60

Gly Gln Cys Asp Gly Phe Ile Trp Gly Gly Gly Ser Leu Met Gln Asp
65                  70                  75                  80

Val Thr Ser Val Val Ser Pro Leu Tyr Tyr Gly Gly Leu Met Ala Ile
                85                  90                  95

Ala Gln Met Arg Arg Leu Lys Thr Ile Ala Trp Ala Gln Gly Ile Gly
            100                 105                 110

Pro Leu Arg Arg Pro Pro Leu Arg Trp Phe Thr Gln Gln Val Leu Arg
        115                 120                 125

Gly Cys Ser Gly Ile Ser Val Arg Asp Gln Ala Ser Leu Gln Leu Val
    130                 135                 140

Lys Gln Trp Gly Leu Lys Ala Phe Leu Ala Ala Asp Pro Val Trp Ser
145                 150                 155                 160

Leu Ala Ala Glu Asn Ala Ser Ser Ser Pro Ser Pro Leu Pro Met Val
                165                 170                 175

Ala Val Asn Leu Arg Ala His Pro Leu Leu Thr Leu Glu Arg Leu Ala
            180                 185                 190

Val Ile Thr Glu Ala Leu Arg Asp Phe Gln His Gln Thr Gln Thr His
        195                 200                 205

Val Arg Leu Ile Pro Leu Gln Lys Ser Gln Asp Leu Ala Ile Ala Glu
    210                 215                 220

Ala Ile Ala Val Glu Leu Pro Gly Ser His Glu Ile Leu Tyr Arg Pro
225                 230                 235                 240

Asp Pro Arg Glu Cys Lys Gly Leu Phe Arg Gly Ala Glu Phe Thr Ile
                245                 250                 255

Gly Met Arg Leu His Ser Leu Ile Met Ala Ala Ala Glu Gly Ser Ala
            260                 265                 270

Cys Phe Ala Leu Ser Tyr Asp Pro Lys Val Ser Arg Leu Ile Ala Glu
        275                 280                 285

Val Gly Leu Pro Gly Arg Glu Leu Ala Asp Leu Pro
    290                 295                 300
```

<210> SEQ ID NO 5
<211> LENGTH: 339
<212> TYPE: PRT
<213> ORGANISM: Synechocystis sp. PCC7942

<400> SEQUENCE: 5

```
Met Arg Ala Leu Leu Cys Gly Tyr Tyr Gly Glu Gly Asn Gly Gly Asp
1               5                   10                  15

Glu Ala Leu Leu Ala Ala Leu Leu Gln Leu Leu Pro Pro Thr Val Glu
            20                  25                  30
```

```
Pro Leu Val Leu Ser Gly Asn Pro Ala Ala Thr Arg Thr Cys Tyr Gly
        35                  40                  45

Val Glu Ala Cys Asp Arg Arg Ser Gly Ala Ala Val Trp Gln Ala Leu
    50                  55                  60

Arg Arg Ser Asp Leu Phe Ile Phe Gly Gly Gly Ser Leu Ile Gln Asp
65                  70                  75                  80

Val Thr Ser Trp Thr Ser Pro Leu Tyr Tyr Cys Gly Leu Met Gly Leu
                85                  90                  95

Ala Gln Gln Leu Gly Leu Lys Thr Ile Ala Trp Ala Gln Gly Ile Gly
            100                 105                 110

Pro Leu Gln Arg Lys Arg Thr Arg Trp Leu Ala Arg Arg Thr Phe Gln
        115                 120                 125

His Cys Asp Arg Ile Thr Val Arg Asp Arg Gly Ser Ala Ala Leu Leu
    130                 135                 140

Lys Glu Trp Gly Ile Ser Val Ala Ile Ala Pro Asp Pro Val Trp Ala
145                 150                 155                 160

Leu Glu Pro Leu Pro Leu Asp Gln Pro Leu Ser Asn Gln Glu Ala Ile
                165                 170                 175

Ala Val Cys Leu Arg Pro His Pro Glu Leu Thr Pro Glu Arg Ser Asp
            180                 185                 190

Arg Leu Lys Ala Ala Leu Thr Thr Leu Gln Ser Gln Thr Gln Ala Pro
        195                 200                 205

Ile Leu Leu Ile Pro Phe His His Gln Gln Asp Arg Pro Leu Ala Ala
    210                 215                 220

Gln Trp Ala Ser Glu Ile Pro Gln Ala Glu Val Leu Asp Trp Gln His
225                 230                 235                 240

Pro Arg Gln Leu Leu Ser Tyr Phe Gln Ser Val Arg Leu Thr Ile Ala
                245                 250                 255

Met Arg Phe His Gly Leu Val Met Ala Ala Ala Ala Gly Asn Arg Cys
            260                 265                 270

Phe Gly Leu Ser Tyr Asp Pro Lys Val Arg Arg Phe Leu Asp Ala Leu
        275                 280                 285

Glu Gln Pro Gly Trp Asp Leu Pro Glu Ile Pro Asp Ser Ala Glu Ala
    290                 295                 300

Ile Ala Ala Ala Trp Leu Glu Ser Trp Gln Ala Glu Pro Ile His Ala
305                 310                 315                 320

Ala Ala Ile Ala Asp Leu Arg Gln Gln Val Asp Val His Arg Gln Ala
                325                 330                 335

Leu Val Phe


<210> SEQ ID NO 6
<211> LENGTH: 350
<212> TYPE: PRT
<213> ORGANISM: Anabaena cylindrica PCC 7122

<400> SEQUENCE: 6

Met Val Lys Ile Arg Ala Leu Leu Ser Gly Tyr Tyr Gly Lys Gly Asn
1               5                   10                  15

Gly Gly Asp Glu Ala Leu Leu Ala Thr Leu Leu Gln Met Leu Pro Pro
            20                  25                  30

Asp Val Thr Pro Val Val Leu Ser Gly Asn Pro Glu Glu Thr Lys Lys
        35                  40                  45

Arg Tyr Gly Val Glu Ser Tyr Asn Arg Met Ala Phe Leu Gln Ile Ile
    50                  55                  60
```

```
Lys Ala Leu Arg Ser Cys Asp Ala Phe Ile Trp Gly Gly Gly Ser Leu
65                  70                  75                  80

Met Gln Asp Ala Thr Ser Ser Ile Ser Pro Phe Tyr Tyr Gly Gly Leu
                85                  90                  95

Met Ala Leu Ala Gln Ala Met Gly Leu Lys Thr Val Ala Trp Gly Gln
            100                 105                 110

Gly Ile Gly Pro Leu Leu Arg Ser Gln Thr Arg Trp Leu Ala Lys Arg
        115                 120                 125

Asn Phe Ala Leu Cys Thr Lys Ile Ser Val Arg Asp Arg Ser Ser Ala
    130                 135                 140

Ala Leu Leu Ser Asn Trp Gly Ile Pro His Ile Leu Ala Pro Asp Pro
145                 150                 155                 160

Val Trp Ala Leu Glu Ser Lys Pro Val Thr Glu Leu Ala Asp Leu Pro
                165                 170                 175

Lys Pro Arg Ile Ala Val Ile Leu Arg Asn His Pro Gln Leu Thr Glu
            180                 185                 190

Thr Arg Leu Ala Asn Leu Ile His Ala Leu Val Asp Leu Gln Gln Ala
        195                 200                 205

Thr Gln Ala Phe Ile Leu Leu Leu Pro Phe Gln Lys Ser Glu Asp Leu
    210                 215                 220

Asp Ile Ala Glu Lys Ile Gln Leu Gln Leu Lys Asp Val Ser Lys Ile
225                 230                 235                 240

Ile Cys Ala Glu Asp Pro Gln Leu Leu Lys Gly Ile Phe Arg Gly Val
                245                 250                 255

Glu Met Ala Ile Gly Met Arg Leu His Ser Leu Ile Met Ala Ala Ser
            260                 265                 270

Glu Gly Cys Arg Cys Phe Ala Leu Ser Tyr Asp Pro Lys Val Asn His
        275                 280                 285

Leu Met Glu Asp Leu Glu Ile Pro Gly Trp Asp Leu Lys Asp Leu Pro
    290                 295                 300

Thr Asp Val Asp Leu Met Ser Lys Thr Trp Ile Gln Tyr Tyr His Asn
305                 310                 315                 320

Ser Glu Ala Leu Ser Ser Glu Lys Ile Gln Ser Leu Val Asn Gly Ala
                325                 330                 335

Phe Leu His Arg Asp Leu Leu Arg Ala Ser Leu Ser Asn Lys
            340                 345                 350
```

<210> SEQ ID NO 7
<211> LENGTH: 1352
<212> TYPE: DNA
<213> ORGANISM: Synechocystis PCC6803

<400> SEQUENCE: 7

```
atgcttaaac tatcttggaa gtccctgtta gtgagccctg ctgtgatcgg tgccgccctt      60

gtggctggtg ctgctagtgc tgctcccgac aacgttacga atgctcaagt tttagaccaa     120

ttagaccaat acactgccga aggtcagtct tctgccattg atcaagtaac cagcgttagc     180

gaactccgcg atgtgcaacc cactgcctgg gcctatgaag cgctcaagag cttggtggaa     240

cgctacggtt gtatcgttgg ttaccctgac cgtaccttcc gtggtgatcg agccctcagc     300

cgttgggaat ttgccgctgg tcttaacgcc tgtatgaacg ttatggaacg tttgattcag     360

gaaaacgtgg ctgttctccg ggaggacatc gacaaactga aacgcctcat gcaggaattc     420

gaggcagaat tggctgcttt gggtgctcgg gttgataacc tcgaagcccg cacctctttc     480

ctcgaagacc atcagttttc taccaccacc aaattgaccg gggaagtaat atttgctccc     540
```

accgccattt ttggtaccaa aaagactctc aacaaccaaa ccgataacaa ccaagcggta 600
ttccagaacc gggttcgttt acagttcaac accagcttct ccggtgaaga cctgttggtc 660
actcgtctcg ccgctggtaa cggtaatcgc ttcaagagct tctatcctac tcagaatgtt 720
attgatcccg agaccggtaa ccccatcggt attgtaggtg actactatga aagccccacc 780
tttacccagg tgcaccagct ttcccccggc gacaacaaca acgtagccgt tgactggtta 840
gcttactatg ttcccttgga tctgggcgaa aacttccgtc tcaacaacta cattgctgct 900
tggggcggta tctgggatga cttcgttcct accctgaacc cctatttcga cgactacact 960
ggcggcaaag gttccttgag tcagttcacc gcccagaacc ccatctactc cattggtggc 1020
ggtactggta taggtacaag cctagagttg ggcttcctca gcaatctgtt gggccccact 1080
tccttgagct tgggttactt ggctagcacg ggcaacaacc ccagcagtgg tggttctgtt 1140
actaaccctg ccactggcaa caattatgac ttcagcagcg gtggtaacgg tttgtttaac 1200
ggtggctata gcgccttggc tcaaattacc accaacattt tcgaccgggt tagcctaggc 1260
ttcacctacg ttaatgccta caccacccct gatgccgcta tcttcggtaa aggtggcact 1320
caaggtatcg tcggtaccac tgcggctaac ct 1352

<210> SEQ ID NO 8
<211> LENGTH: 1353
<212> TYPE: DNA
<213> ORGANISM: Synechococcus sp. NIES-970

<400> SEQUENCE: 8
atgtctaaag caatgagaaa tcttctcagt ggtgcaaccg ttgctctcgg tgcaactgtt 60
gctttttctg gcgcagcgat cgccgaagaa aaccaagccg tcctcgacca gatcagtcaa 120
tacagcactg ataactccgt tgctcaggtc aacagcgttt tccagctcag cgacgtttcc 180
ccttccgatt gggcttttga cgcgctccgc aacttggttg aaaactacaa ctgtatcgtt 240
ggttatcctg atggtacttt ccgtggcact cgcccccctca gccgttatga gttcgccgca 300
ggtctgaatg cttgtttgca acagatcgaa cggatgctcg aaggtggcgg tgaagtaacc 360
caagaagatc tcgcagccct ccgtcgtctg ctcaacgaat ttgaagcaga actagctacc 420
ctcggcgctc gtgttgatga ccttgatggc cgtgttgagt tccttgaaga caatcagttc 480
tccaccacca ccaaactgaa tggggaagtt atcttcaacc ttggtggcgc ttttggcgat 540
agcagagctg atggtcctgg cccaatcgat gatgagttca cattcagcaa tcgtgttcgt 600
ctgaacctag acactagctt cactggtcgc gatcgcctcc gcactcgtct tgaagctggc 660
aatatcactc gcttagaccg tgcaactggt gtagatgcag cccgtctcgg ctttgacact 720
aacaacggta atgatgttga aattgggaaa ttgttctacc gcttccctgt aggtgacaac 780
attactgcct atgtcggtgc cgttggccta ggtcttgatg acatatttga tgtaaccaac 840
ccatattttg agagcagcgg taatggtgcc ctctctcgtt tcggtcgttt taaccccatc 900
taccgtggcc ccgatggtgc tggtgctggt tttaacttcg atcttggtga aagagttacc 960
ttctccgcag cttaccttgc ggatgatggt ggtgctagca gccctgtctc gaagaatggc 1020
ctgttcaatg gcaactacac tgcgggtgct cagctcgatt ttgctccctc tgacaacatc 1080
atgctgtctg ccgtttatac ccgtcgctac caacagggtg gcgatgtcaa cctgagcggt 1140
agcactggta gtgattttgc tgcagatcct tttggttttg ctgcttcttc caacaacttc 1200
ggcttacaag gtagctggtt gatcggtgaa aaattcaacc ttggtggctg ggtcggctac 1260
accaatgctg atctcaaaga tcctgttgtc accggtaacg ctgatgtttg gaactgggct 1320
gttaacgccg ctctacttga tgtcggcggc gaa 1353

<210> SEQ ID NO 9
<211> LENGTH: 1360
<212> TYPE: DNA
<213> ORGANISM: Anabaena cylindrica PCC 7122

<400> SEQUENCE: 9
atgtctaatc tattgtggaa atccttggtg gttagcccag ccgtgttggg agccgcctta 60
ttagtttcag gaacagcgat cgcatcgccc gccgcaggca actcagcctc aaatgctgct 120
actgaagtat caatactaga aacacaagcg gcaacagagg ttgttcaaca acctgtagta 180
ttggctcaag tcaagcaaga cactcaggtt ttagatcaag ttaaacgcta cagtaacgaa 240
ggtcaaaatc tacaatctca agtaacatca gtctctcagt tttccgatgt ccaaccaact 300
gactgggcat tccaagcttt gcagtccttg gtggaacgtt atggttgtat cgcaggttat 360
cccaatggta catatcgcgg aaaccgtgct ttaacccgtt atgaatttgc cgctggtttg 420
aatgcctgtt tagaccgggt gaatgaattg attgccacag caacagctga catggtgaca 480
aaacaggatt tagccacctt acagcgcttg caagaagaat ttctgctga attggcaact 540 ttacgcggtc gtgtcgatgc tttggaagca cgcactgctg agttagaagc taatcaattc 600
tctactacca ccaaattgca aggtgaagct atttttgctc tgaccgatgc ttttaatggt 660
gacattgccg gtaagaccgt tttcaagat agagtgcgtt tgaacctgca aagcagcttc 720
acaggtcgag atatgttgaa tacccgtttg gctgcgggta atgcacaaaa ctttggaaac 780
actggggaaa gtagacaaac ctttgacgtt ggtagcactg ggactaacaa tgttgtgtta 840
gacaaactga cctatgaagc tcctgttggt ccagcacagg tctacatagc agctacaggt 900
ggtaaacaca gccattatgc tgctgttaac aacccttact tctttgataa aactgatggt 960
ggtaacggtg ctttaagtac ctttagttct gaaaacccca tctatcgaat tggtggtggt 1020
tctggtattg cccttaatgt acccttttggt caaggtggcg gtattctcaa accaagttca 1080
ttgacattgg gttatttggc ttctgaggct aatagtcctg ctgctggtga aggtttgttc 1140
gacggtaact atgctgcttt aggtcagtta aactttaacg ttggtaatcg cattgcctta 1200
gctgctactt atgtacatgg ttatcatggt gctagtagcc gtttgtttga ctcaggagag 1260
ggtgatgata tcgtaggtac atcactagct aataatctca gtttaggtag cgcctcgtcc 1320
agcaactcct acggtgtttc tgctgccttc agacctagcg 1360

<210> SEQ ID NO 10
<211> LENGTH: 1032
<212> TYPE: DNA
<213> ORGANISM: Synechocystis PCC6803

<400> SEQUENCE: 10
atgcgtgtca ttctgtgtgg ttactacggc caagacaatg ctggggatga agccctttta 60
gtctgtttgc tgcaaatgct tcctgcgacg gtggagccag tggtgctctc cgccaatccc 120
caggtcacca cagcgagata cggtgttaaa gcccactaca accgagactg gggcaaaatt 180
tggcagcttt tgggtcaatg tgacggtttt atctgggggg gaggcagttt gatgcaggat 240
gtgaccagcg tggttagtcc cctatactac ggtggtttga tggcgatcgc ccagatgcgg 300
cgtttaaaaa ccattgcctg ggcccagggc attggccccc ttagaaggcc gccgttgcgc 360
tggtttaccc aacaggtgct ccggggttgt agcggcatca gcgtacggga tcaagcttct 420
ttgcaattag ttaaacaatg gggcttaaag gctttttttag cggcggatcc ggtgtggtct 480
ttagccgctg aaaatgcgtc ttcttccccc agccctttgc ccatggtggc ggtgaatttg 540
cgggcccatc ctttgttaac cttggaacgc ttggcggtca ttaccgaagc cctaagggat 600
tttcaacacc agacccaaac ccatgtgcgg ctcattcccc tacaaaaatc ccaggatttg 660
gccattgccg aagcgatcgc cgtggaattg ccggggagtc atgaaattct ttaccgcccc 720
gaccccaggg aatgtaaagg tttgttccgg ggggcggaat tcaccattgg catgcggctc 780
cacagtttaa tcatggccgc ggcggagggc agtgcctgct ttgcccttag ttatgaccct 840
aaagttagtc gtttaatcgc agaggtggga ctaccgggcc gggaattggc ggatttaccc 900
agggatagca acgaactcag ccaggtttgg cagggacatt tccggcaaag acaaccctct 960
accggggtag agttcttgca aaaatctgcc cttcagcatc aaactttgtt gcagaaaatt 1020
tttgttgact ag 1032

<210> SEQ ID NO 11
<211> LENGTH: 1020
<212> TYPE: DNA
<213> ORGANISM: Synechocystis sp. PCC7942

<400> SEQUENCE: 11
atgcgggcgt tgctctgtgg ctattacgga gagggcaatg ggggagatga ggcgctgttg 60
gcagcgctgt tgcaactctt gccgccgaca gtggaaccgc tggtgctgtc ggggaatcct 120
gcggcaactc gcacttgcta cggcgtagaa gcttgcgatc gccgatcggg ggctgcggtt 180
tggcaggcac tgcgacgcag tgatctattc atctttggcg gcggcagcct gattcaagat 240
gtcacaagct ggacgagccc tctctactac tgcggtctga tggggctggc acaacagtta 300
ggtctcaaaa cgatcgcctg ggcccagggc attgggccac tgcagcgcaa acgaacccgc 360
tggttggcac gccgaacgtt tcagcactgc gatcgcatta cagtgcgcga tcgcggttct 420
gctgccttgc taaaagagtg gggatttct gtggcgattg ccccggatcc cgtttgggct 480
ttagagccgc tgcctttaga tcagccgctg tcgaaccaag aggcgatcgc ggtttgtctg 540
cggccccacc ctgagttgac gcctgagcgc agcgatcgct tgaaagctgc cctgacaact 600
ctgcaatcgc aaacccaagc acccatcctg ctgattccct tccaccacca gcaagatcga 660
ccactggccg cgcaatgggc aagcgaaatt ccccaagcag aagttttgga ctggcagcat 720
ccgcgccagc tcctcagcta ctttcagtcg gtgcgattaa cgatcgccat gcgcttccat 780
ggattagtga tggcagcagc ggctggaaat cgttgctttg gcctcagcta tgaccccaaa 840
gtgcgccgtt tcctggatgc ccttgagcaa cccggctggg atttgccgga gattccagac 900
tctgctgagg cgatcgcggc cgcttggtta gagtcttggc aagcagaacc gattcatgcc 960
gctgcgatcg cggacctccg tcagcaagtg gatgtccatc gccaggcttt agttttttga 1020

<210> SEQ ID NO 12
<211> LENGTH: 1053
<212> TYPE: DNA
<213> ORGANISM: Anabaena cylindrica PCC 7122

<400> SEQUENCE: 12
ctacttatta ctcaatgatg ctctcaataa atcccgatgt aaaaaagctc catttactaa 60
agattgtatt ttctcagatg ataatgcttc gctattgtga taatattgaa tccaggtttt 120
actcattaaa tctacatcag ttggtaaatc ctttaaatcc catccaggta tttctaaatc 180
ttccatcaaa tggttaacct tggggtcata actcaaagca aaacaacgac aaccttcact 240
agctgccata attaaactgt gtagacgcat ccctattgcc atttctacac cacgaaatat 300
accttttaaa agttgtggat cttctgcaca gataatttta ctaacatctt ttaattgcag 360
ttgaattttt tctgcaatat ctaaatcttc acttttttga aaaggcaata ataaaataaa 420
tgcttgggta gcttgttgta aatcaactaa ggcatggatt aaatttgcta accgagtttc 480
tgtaagttgg ggatgatttc ttaaaataac ggcaattcta ggttttggta aatctgctaa 540
ttctgttact ggtttagatt ctaaagccca aactggatca ggtgcaagaa tatgaggtat 600
gccccaattt gataataaag ccgcactaga gcgatcgcgt acactgattt tagtacaaag 660
agcaaaattt cgctttgcta accaacgagt ttgcgatcgc aataaaggcc ctattccctg 720
tccccaagct acagttttca aacccatcgc ttgagctaaa gccattaatc ccccataata 780
aaaagggcta atgctgctag tcgcatcctg cattaaactt ccaccacccc agatgaaagc 840
atcacaggaa cgcaaagctt tgataatctg caaaaacgcc atacggttgt aactttccac 900
accataacgc tttttagttt cctcaggatt cccagaaagc accacaggcg ttacatcagg 960
tggtagcatt tgcagaagtg tcgccaacaa agcttcatca ccaccattac ctttaccgta 1020
atacccagac aataacgccc gtatcttcac cat 1053

<210> SEQ ID NO 13
<211> LENGTH: 40
<212> TYPE: DNA
<213> ORGANISM: Artificial Sequence
<220> FEATURE:
<223> OTHER INFORMATION: Synthesized Primer

<400> SEQUENCE: 13
cagtgaattc gagctcggta tatagcgttg cagtccctgg 40

<210> SEQ ID NO 14
<211> LENGTH: 40
<212> TYPE: DNA
<213> ORGANISM: Artificial Sequence
<220> FEATURE:
<223> OTHER INFORMATION: Synthesized Primer

<400> SEQUENCE: 14
gattacgcca agcttgcatg accgcggtca cttcataacc 40

<210> SEQ ID NO 15
<211> LENGTH: 47
<212> TYPE: DNA
<213> ORGANISM: Artificial Sequence
<220> FEATURE:
<223> OTHER INFORMATION: Synthesized Primer

<400> SEQUENCE: 15
cagtgaattc gagctcggta ataaccgttg tcccttttgt ttcatcg 47

<210> SEQ ID NO 16
<211> LENGTH: 45
<212> TYPE: DNA
<213> ORGANISM: Artificial Sequence
<220> FEATURE:
<223> OTHER INFORMATION: Synthesized Primer

<400> SEQUENCE: 16
tgttagtgag ccctgctgtt agctcccagt atctctatca ctgat 45

<210> SEQ ID NO 17
<211> LENGTH: 51
<212> TYPE: DNA
<213> ORGANISM: Artificial Sequence
<220> FEATURE:
<223> OTHER INFORMATION: Synthesized Primer

<400> SEQUENCE: 17
acagcagggc tcactaacag ttttagagct agaaatagca agttaaaata a 51

<210> SEQ ID NO 18
<211> LENGTH: 44
<212> TYPE: DNA
<213> ORGANISM: Artificial Sequence
<220> FEATURE:
<223> OTHER INFORMATION: Synthesized Primer

<400> SEQUENCE: 18
gattacgcca agcttgcatg gggaacaagc tgaatctggg catc 44

<210> SEQ ID NO 19
<211> LENGTH: 45
<212> TYPE: DNA
<213> ORGANISM: Artificial Sequence
<220> FEATURE:
<223> OTHER INFORMATION: Synthesized Primer

<400> SEQUENCE: 19
ttttagtctg tttgctgcat agctcccagt atctctatca ctgat 45

<210> SEQ ID NO 20
<211> LENGTH: 51
<212> TYPE: DNA
<213> ORGANISM: Artificial Sequence
<220> FEATURE:
<223> OTHER INFORMATION: Synthesized Primer

<400> SEQUENCE: 20
tgcagcaaac agactaaaag ttttagagct agaaatagca agttaaaata a 51

<210> SEQ ID NO 21
<211> LENGTH: 19
<212> TYPE: DNA
<213> ORGANISM: Synechocystis PCC6803

<400> SEQUENCE: 21
acagcagggc tcactaaca 19

<210> SEQ ID NO 22
<211> LENGTH: 19
<212> TYPE: DNA
<213> ORGANISM: Synechocystis PCC6803

<400> SEQUENCE: 22
tgcagcaaac agactaaaa 19

PLANT GROWTH PROMOTER PRODUCTION METHOD, PLANT GROWTH PROMOTER, AND PLANT GROWTH PROMOTING METHOD

CROSS REFERENCE TO RELATED APPLICATIONS

This is a continuation application of PCT International Application No. PCT/JP2020/047573 filed on Dec. 18, 2020, designating the United States of America, which is based on and claims priority of Japanese Patent Application No. 2019-231897 filed on Dec. 23, 2019. The entire disclosures of the above-identified applications, including the specifications, drawings and claims are incorporated herein by reference in their entirety.

FIELD

The present disclosure relates to a production method for a plant growth promoter which is a natural metabolite that contributes to enhancement in plant growth, a plant growth promoter, and a plant growth promoting method.

BACKGROUND

There is a need for the development of techniques for efficiently producing agricultural crops in limited cultivated lands with requirements for increased food production associated with a growing world population. The utilization of organism-derived starting materials aimed at reducing the consumption of fossil resources is increasing from the viewpoint of the prevention of global warming and reduction in environmental load. Among others, there is a demand for the exploitation of naturally derived substances with less consumption of fossil energy in a production process and with less environmental load in application.

For example, methods for inoculating plants with a microbe producing a substance involved in promoting growth of a plant (hereinafter, also referred to as a plant growth promoting substance), or a culture solution or the like of the microbe (Patent Literature (PTL) 1, PTL 2, and Non Patent Literature (NPL) 1) are disclosed as approaches of enhancing crop production that exploits naturally derived substances. For example, a method for improving the availability of metal ions by plants is also disclosed which comprises adding a natural metabolite such as an organic acid to soil so that the metal ions in the soil are chelated (PTL 3). For example, a method for applying a composition containing a natural metabolite adenosine to plants (PTL 4), and a method for applying a fertilizer containing cell extracts of algae to plants (PTL 5) are also disclosed.

CITATION LIST

Patent Literature

PTL 1: Japanese Unexamined Patent Application Publication No. 2018-11600

PTL 2: Japanese Unexamined Patent Application Publication No. S63-501286

PTL 3: Japanese Unexamined Patent Application Publication No. 2014-073993

PTL 4: Japanese Patent No. 5943844

PTL 5: Japanese Patent No. 3143872

Non Patent Literature

NPL 1: Jimenez-Gomez et al., "Probiotic activities of *Rhizobium laguerreae* on growth and quality of spinach", Scientific reports, 2018, Vol. 8, 295

SUMMARY

Technical Problem

However, in the conventional techniques described above, a process such as the microbial production of a plant growth promoting substance or the purification or extraction of a plant growth promoting substance is complicated and time-consuming and is also costly. Also, in the conventional techniques described above, a loss such as reduction in the yield or activity of a plant growth promoting substance occurs in purifying and extracting the plant growth promoting substance. On the other hand, in the case of inoculating plants with a microbe itself, its effects differ depending on a combination of the microbial species used, the plant species of interest, and the properties of soil. Thus, this approach is poorly versatile and has an unstable plant growth promoting effect.

In view of this, the present disclosure provides a plant growth promoter production method which can conveniently and efficiently produce a plant growth promoter having an improved plant growth promoting effect. The present disclosure also provides a plant growth promoter which can effectively promote plant growth, and a plant growth promoting method using the plant growth promoter.

Solution to Problem

A plant growth promoter production method according to an aspect of the present disclosure includes: preparing a modified cyanobacterium in which a function of a protein involved in binding between an outer membrane and a cell wall of cyanobacterium is suppressed or lost; and causing the modified cyanobacteria to secrete a secretion involved in promoting growth of a plant.

Advantageous Effects

The plant growth promoter production method of the present disclosure can conveniently and efficiently produce a plant growth promoter having an improved plant growth promoting effect. The plant growth promoter of the present disclosure can effectively promote plant growth. The plant growth promoting method of the present disclosure can effectively promote plant growth by using the plant growth promoter of the present disclosure.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a diagram illustrating results of a spinach cultivation test.

FIG. 11 is a diagram illustrating results of a petunia cultivation test.

FIG. 14 is a diagram illustrating results of a strawberry cultivation test.

FIG. 15 is a diagram illustrating results of a strawberry cultivation test.

FIG. 16 is a diagram illustrating results of a strawberry cultivation test.

FIG. 17 is a diagram illustrating results of a hydroponic lettuce cultivation test.

DESCRIPTION OF EMBODIMENTS

Figure 1:
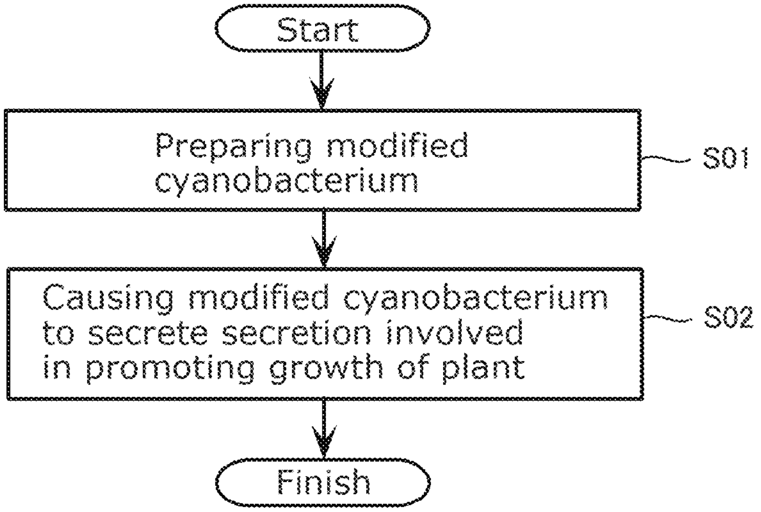
FIG. 1 is a flow chart illustrating one example of a plant growth promoter production method according to an embodiment.

Underlying Knowledge Forming Basis of Present Disclosure

As mentioned in the Background Art, there is a need for techniques for efficiently producing agricultural crops in limited cultivated lands. In order to promote crop production, there is also a need for the exploitation of naturally derived substances with less environmental load in application. Among others, there is a demand for substances with less consumption of fossil energy at the time of production of the substances and with much less environmental load.

The following conventional techniques are disclosed as techniques of promoting crop promotion.

For example, PTL 1 discloses a method for applying a microbial strain having plant growth promoting activity or cultures of the microbial strain to a plant or the neighborhood (e.g., soil) of the plant. Use of the method reportedly permits not only promotion of plant growth and increase in yield but prevention of development of pathogenic diseases of the plant.

For example, PTL 2 discloses a method comprising mixing a bacterial culture solution with a culture solution of algae, incubating the mixed solution under predetermined conditions to produce a plant growth promoting composition, and applying the composition to a plant. The method reportedly promotes the vegetative growth of tomato when the composition is added to a nutrient solution for the hydroponic cultivation of the plant.

For example, NPL 1 discloses a method for applying one type of rhizobium as a plant probiotic bacterium having a plant growth promoting mechanism to spinach, more specifically, to the root of spinach. The method reportedly produces a growth promoting effect such as increase in the number of leaves and leaf size of spinach inoculated with the rhizobium.

For example, PTL 3 discloses a method for improving the availability of metal ions by plants, comprising adding a natural metabolite (which is a substance involved in metabolism and refers to a naturally occurring substance) such as an organic acid to soil so that the metal (e.g., iron) ions in the soil are chelated.

For example, PTL 4 discloses a method for applying a composition composed mainly of a natural metabolite adenosine to plants.

For example, PTL 5 discloses a method for applying a fertilizer containing cell extracts of algae to plants. More specifically, the cell extracts are obtained by treating cyanobacteria with an aqueous solvent (e.g., water) at 60 °C or higher.

However, in the conventional techniques described above, a process such as the microbial production of a plant growth promoting substance or the purification or extraction of a plant growth promoting substance is complicated and time-consuming and is also costly. Also, in the conventional techniques described above, a loss such as reduction in the yield or activity of a plant growth promoting substance occurs in purifying and extracting the plant growth promoting substance. On the other hand, in the case of inoculating plants with a microbe itself, its effects differ depending on a combination of the microbial species used, the plant species of interest, and the properties of soil. Thus, this approach is poorly versatile and has an unstable plant growth promoting effect. Thus, there is a demand for the development of naturally derived substances that can be produced by a convenient process using a more inexpensive starting material and have a high plant growth enhancing effect.

The present inventors have focused on cyanobacterium as a microbe for use in the production of plant growth promoting substances. Cyanobacterium (also called blue-green bacterium or blue-green alga), a group of eubacterium, produces oxygen by splitting water through photosynthesis, and fixes $CO_2$ in air. Cyanobacterium can also fix nitrogen ($N_2$) in air, depending on its species. Thus, cyanobacterium can obtain a large part of starting materials (i.e., nutrients) and energy necessary for bacterial cell growth from air, water, and light and can therefore be cultured by a convenient process using an inexpensive starting material.

Rapid growth and high light use efficiency are known as characteristics of cyanobacterium. In addition, its genetic manipulation is easier than that of other eukaryotic alga species. Therefore, bio-manufacturing that utilizes cyanobacterium among the photosynthetic microbes is under active research and development. For example, the production of fuels such as ethanol, isobutanol, alkanes, and fatty acids (PTL 6: Japanese Patent No. 6341676) has been reported as examples of bio-manufacturing using cyanobacterium. The production of substances serving as nutrient sources for organisms is also under research and development. For example, since protein can be synthesized only by living organisms, there is a need for the development of techniques of conveniently and efficiently producing protein. The exploitation of cyanobacterium which can utilize light energy and $CO_2$ in the air is expected as an organism species for use in such techniques, and is under active research and development (NPL 2: Jie Zhou et al., "Discovery of a super-strong promoter enable efficient production of heterologous proteins in cyanobacteria", Scientific Reports, Nature Research, 2014, Vol. 4, Article No. 4500).

For example, the technique described in NPL 2 described above can achieve efficient expression of a heterologous gene in cyanobacterium. Use of the technique enables a desired protein to be produced within the cell of cyanobacterium (hereinafter, also referred to as within the bacterial cell). However, the intracellularly produced protein of cyanobacterium is difficult to secrete to the outside of the cell, it is necessary to disrupt the cell of cyanobacterium and extract the intracellularly produced protein.

Accordingly, the present inventors have found that protein produced within the bacterial cell of cyanobacterium and metabolites within the bacterial cell are easily secreted to the outside of the bacterial cell by partially detaching the outer membrane which surrounds the cell wall of cyanobacterium from the cell wall. The present inventors have further found that a secretion of cyanobacterium has a plant growth promoting effect. As a result, a plant growth promoting substance secreted to the outside of the bacterial cell can be efficiently retrieved without disrupting the bacterial cell of the cyanobacterium. Furthermore, the physiological activity of the plant growth promoting substance is less likely to be impaired because operations such as extraction are unnecessary. Therefore, a plant growth promoter containing the secretion can effectively promote plant growth.

Thus, the plant growth promoter production method of the present disclosure can conveniently and efficiently produce a plant growth promoter having an improved plant growth promoting effect. The plant growth promoter of the present disclosure can effectively promote plant growth. The plant growth promoting method of the present disclosure can effectively promote plant growth by using the plant growth promoter of the present disclosure.

Outline of Present Disclosure

An outline of an aspect of the present disclosure is as described below.

A plant growth promoter production method according to an aspect of the present disclosure includes: preparing a modified cyanobacterium in which a function of a protein involved in binding between an outer membrane and a cell wall of cyanobacterium is suppressed or lost; and causing the modified cyanobacteria to secrete a secretion involved in promoting growth of a plant.

As a result, the binding (e.g., binding level and binding force) between the cell wall and the outer membrane is partially reduced in the modified cyanobacterium. This facilitates partially detaching the outer membrane from the cell wall. Hence, protein and metabolites produced within the bacterial cell (hereinafter, also referred to as intra-bacterial cell produced substances) easily leak out to the outside of the outer membrane, i.e., the outside of the bacterial cell. This facilitates secreting protein and metabolites produced within the bacterial cell of the modified cyanobacterium to the outside of the bacterial cell and therefore eliminates the need of extraction treatment of the intra-bacterial cell produced substances, for example, the disruption of the bacterial cell. Hence, a plant growth promoter containing a secretion of the modified cyanobacterium can be produced conveniently and efficiently. The intra-bacterial cell produced substances are less susceptible to reduction in physiological activity and yield because the extraction treatment of the intra-bacterial cell produced substances is unnecessary. Hence, a substance involved in promoting growth of a plant (hereinafter, also referred to as a plant growth promoting substance) among the intra-bacterial cell produced substances of the modified cyanobacterium is also less susceptible to reduction in physiological activity and yield. As a result, the secretion of the modified cyanobacterium has an improved effect involved in promoting growth of a plant (hereinafter, also referred to as a plant growth promoting effect). The intra-bacterial cell produced substances can be produced by repeatedly using the modified cyanobacterium even after retrieval of the intra-bacterial cell produced substances secreted to the outside of the bacterial cell because the extraction treatment of the intra-bacterial cell produced substances is unnecessary. This eliminates the need of providing a fresh modified cyanobacterium for each plant growth promoter production. Thus, the plant growth promoter production method according to an aspect of the present disclosure can conveniently and efficiently produce a plant growth promoter having an improved plant growth promoting effect.

For example, in the plant growth promoter production method according to an aspect of the present disclosure, the protein involved in the binding between the outer membrane and the cell wall may be at least one of a surface layer homology (SLH) domain-containing outer membrane protein or a cell wall-pyruvic acid modifying enzyme.

As a result, in the modified cyanobacterium, for example, (i) a function of at least one of a SLH domain-containing outer membrane protein which binds to the cell wall and an enzyme that catalyzes reaction to modify a linked sugar chain on the surface of the cell wall with pyruvic acid (i.e., a cell wall-pyruvic acid modifying enzyme) is suppressed or lost, or (ii) the expression of at least one of the SLH domain-containing outer membrane protein or the cell wall-pyruvic acid modifying enzyme is suppressed. Hence, the binding (i.e., binding level and binding force) between the SLH domain of the SLH domain-containing outer membrane protein in the outer membrane and a covalently linked sugar chain on the surface of the cell wall is reduced. Accordingly, the outer membrane is easily detached from the cell wall at a site having the weakened binding between the outer membrane and the cell wall. As a result, in the modified cyanobacterium, intra-bacterial cell produced substances such as protein and metabolites produced within the bacterial cell easily leak out to the outside of the bacterial cell, as described above, because the outer membrane is easy to partially detach from the cell wall by the weakened binding between the outer membrane and the cell wall. As a result, the modified cyanobacterium has improved secretory productivity to secrete a plant growth promoting substance produced within the bacterial cell to the outside of the bacterial cell. Thus, the plant growth promoter production method according to an aspect of the present disclosure can efficiently produce a plant growth promoter because the modified cyanobacterium can efficiently secrete the plant growth promoting substance.

For example, in the plant growth promoter production method according to an aspect of the present disclosure, the SLH domain-containing outer membrane protein may be: Slr1841 having an amino acid sequence represented by SEQ ID NO: 1; NIES970_09470 having an amino acid sequence represented by SEQ ID NO: 2; Anacy_3458 having an amino acid sequence represented by SEQ ID NO: 3; or a protein having an amino acid sequence that is at least 50 percent identical to the amino acid sequence of any one of the Slr1841, the NIES970_09470, and the Anacy_3458.

As a result, in the modified cyanobacterium, for example, (i) the function of the SLH domain-containing outer membrane protein represented by any one of SEQ ID NOs: 1 to 3 or a protein having an amino acid sequence that is at least 50 percent identical to the amino acid sequence of any one of these SLH domain-containing outer membrane proteins is suppressed or lost, or (ii) the expression of the SLH domain-containing outer membrane protein represented by any one of SEQ ID NOs: 1 to 3 or a protein having an amino acid sequence that is at least 50 percent identical to the amino acid sequence of any one of these SLH domain-containing outer membrane proteins is suppressed. Hence, in the modified cyanobacterium, (i) the function of the SLH domain-containing outer membrane protein or a protein functionally equivalent to the SLH domain-containing outer membrane protein in the outer membrane is suppressed or lost, or (ii) the expression level of the SLH domain-containing outer membrane protein or a protein functionally equivalent to the SLH domain-containing outer membrane protein in the outer membrane is decreased. As a result, in the modified cyanobacterium, the binding level and binding force with which a binding domain (e.g., the SLH domain) for binding the outer membrane with the cell wall binds to the cell wall are reduced. This facilitates partially detaching the outer membrane from the cell wall. As a result, intra-bacterial cell produced substances easily leak out to the outside of the bacterial cell, so that a plant growth promoting substance produced within the bacterial cell also easily leaks out to the outside of the bacterial cell. Thus, the plant growth promoter production method according to an aspect of the present disclosure can efficiently produce a plant growth promoter because the plant growth promoting substance produced within the bacterial cell of the modified cyanobacterium easily leaks out to the outside of the bacterial cell.

For example, in the plant growth promoter production method according to an aspect of the present disclosure, the cell wall-pyruvic acid modifying enzyme may be: Slr0688 having an amino acid sequence represented by SEQ ID NO: 4; Synpcc7942_1529 having an amino acid sequence represented by SEQ ID NO: 5; Anacy_1623 having an amino acid sequence represented by SEQ ID NO: 6; or a protein having an amino acid sequence that is at least 50 percent identical to the amino acid sequence of any one of the Slr0688, the Synpcc7942_1529, and the Anacy_1623.

As a result, in the modified cyanobacterium, for example, (i) the function of the cell wall-pyruvic acid modifying enzyme represented by any one of SEQ ID NOs: 4 to 6 or a protein having an amino acid sequence that is at least 50 percent identical to the amino acid sequence of any one of these cell wall-pyruvic acid modifying enzymes is suppressed or lost, or (ii) the expression of the cell wall-pyruvic acid modifying enzyme represented by any one of SEQ ID NOs: 4 to 6 or a protein having an amino acid sequence that is at least 50 percent identical to the amino acid sequence of any one of these cell wall-pyruvic acid modifying enzymes is suppressed. Hence, in the modified cyanobacterium, (i) the function of the cell wall-pyruvic acid modifying enzyme or a protein functionally equivalent to the enzyme is suppressed or lost, or ii) the expression level of the cell wall-pyruvic acid modifying enzyme or a protein functionally equivalent to the enzyme is decreased. A covalently linked sugar chain on the surface of the cell wall is thereby less susceptible to modification with pyruvic acid, so that binding level and binding force of the sugar chain of the cell wall that binds to the SLH domain of the SLH domain-containing outer membrane protein in the outer membrane are reduced. As a result, in the modified cyanobacterium, a covalently linked sugar chain on the surface of the cell wall is less susceptible to modification with pyruvic acid, so that binding force between the cell wall and the outer membrane is weakened. This facilitates partially detaching the outer membrane from the cell wall. As a result, intra-bacterial cell produced substances easily leak out to the outside of the bacterial cell, so that a plant growth promoting substance produced within the bacterial cell also easily leaks out to the outside of the bacterial cell. Thus, the plant growth promoter production method according to an aspect of the present disclosure can efficiently produce a plant growth promoter because the plant growth promoting substance produced within the bacterial cell of the modified cyanobacterium easily leaks out to the outside of the bacterial cell.

For example, in the plant growth promoter production method according to an aspect of the present disclosure, a gene which causes expression of the protein involved in the binding between the outer membrane and the cell wall may be deleted or inactivated.

Accordingly, in the modified cyanobacterium, the expression of the protein involved in the binding between the cell wall and the outer membrane is suppressed, or the function of the protein is suppressed or lost. Therefore, the binding (i.e., binding level and binding force) between the cell wall and the outer membrane is partially reduced. As a result, in the modified cyanobacterium, the outer membrane is easy to partially detach from the cell wall, so that intra-bacterial cell produced substances such as protein and metabolites produced within the bacterial cell easily leak out to the outside of the outer membrane, i.e., the outside of the bacterial cell. Hence, the modified cyanobacterium has improved secretory productivity of a plant growth promoting substance produced within the bacterial cell. This eliminates the need of extraction treatment of the intra-bacterial cell produced substances, for example, the disruption of the bacterial cell. Therefore, the intra-bacterial cell produced substances are less susceptible to reduction in physiological activity and yield. Hence, a plant growth promoting substance produced within the bacterial cell is also less susceptible to reduction in physiological activity and yield. Therefore, a plant growth promoter having an improved plant growth promoting effect can be produced. The plant growth promoting substance can be produced by repeatedly using the modified cyanobacterium even after retrieval of the intra-bacterial cell produced substances because the extraction treatment of the intra-bacterial cell produced substances is unnecessary. This eliminates the need of providing a fresh modified cyanobacterium for each plant growth promoter production. Thus, the plant growth promoter production method according to an aspect of the present disclosure can conveniently and efficiently produce a plant growth promoter having an improved plant growth promoting effect.

For example, in the plant growth promoter production method according to an aspect of the present disclosure, the gene which causes expression of the protein involved in the binding between the outer membrane and the cell wall may be at least one of a gene encoding an SLH domain-containing outer membrane protein or a gene encoding a cell wall-pyruvic acid modifying enzyme.

Accordingly, in the modified cyanobacterium, at least one of the gene encoding the SLH domain-containing outer membrane protein and the gene encoding the cell wall-pyruvic acid modifying enzyme is deleted or inactivated. Hence, in the modified cyanobacterium, for example, (i) the expression of at least one of the SLH domain-containing outer membrane protein or the cell wall-pyruvic acid modifying enzyme is suppressed, or (ii) the function of at least one of the SLH domain-containing outer membrane protein or the cell wall-pyruvic acid modifying enzyme is suppressed or lost. Hence, the binding (i.e., binding level and binding force) between the SLH domain of the SLH domain-containing outer membrane protein in the outer membrane and a covalently linked sugar chain on the surface of the cell wall is reduced. Accordingly, the outer membrane is easily detached from the cell wall at a site having the weakened binding between the outer membrane and the cell wall. As a result, in the modified cyanobacterium, protein and metabolites produced within the bacterial cell easily leak out to the outside of the bacterial cell because the outer membrane is easy to partially detach from the cell wall due to the weakened binding between the cell wall and the outer membrane. As a result, a plant growth promoting substance produced within the bacterial cell also easily leaks out to the outside of the bacterial cell. Thus, the plant growth promoter production method according to an aspect of the present disclosure can efficiently produce a plant growth promoter because the modified cyanobacterium can easily secrete the plant growth promoting substance.

For example, in the plant growth promoter production method according to an aspect of the present disclosure, the gene encoding the SLH domain-containing outer membrane protein may be: slr1841 having a nucleotide sequence represented by SEQ ID NO: 7; nies970_09470 having a nucleotide sequence represented by SEQ ID NO: 8; anacy_3458 having a nucleotide sequence represented by SEQ ID NO: 9; or a gene having a nucleotide sequence that is at least 50 percent identical to the nucleotide sequence of any one of the slr1841, the nies970_09470, and the anacy_3458.

As a result, in the modified cyanobacterium, the gene encoding the SLH domain-containing outer membrane protein, represented by any one of SEQ ID NOs: 7 to 9 or a gene having a nucleotide sequence that is at least 50 percent identical to the nucleotide sequence of any one of these genes is deleted or inactivated. Hence, in the modified cyanobacterium, (i) the expression of any one of the SLH domain-containing outer membrane proteins described above or a protein functionally equivalent to any one of these proteins is suppressed, or (i) the function of any one of the SLH domain-containing outer membrane proteins described above or a protein functionally equivalent to any one of these proteins is suppressed or lost. As a result, in the modified cyanobacterium, the binding level and binding force of a binding domain (e.g., the SLH domain) of the outer membrane that binds to the cell wall are reduced. This facilitates partially detaching the outer membrane from the cell wall. As a result, protein and metabolites produced within the bacterial cell easily leak out to the outside of the bacterial cell, so that a plant growth promoting substance produced within the bacterial cell also easily leaks out to the outside of the bacterial cell. Thus, the plant growth promoter production method according to an aspect of the present disclosure can efficiently produce a plant growth promoter because the plant growth promoting substance produced within the bacterial cell of the modified cyanobacterium easily leaks out to the outside of the bacterial cell.

For example, in the plant growth promoter production method according to an aspect of the present disclosure, the gene encoding the cell wall-pyruvic acid modifying enzyme may be: slr0688 having a nucleotide sequence represented by SEQ ID NO: 10; synpcc7942_1529 having a nucleotide sequence represented by SEQ ID NO: 11; anacy_1623 having a nucleotide sequence represented by SEQ ID NO: 12; or a gene having a nucleotide sequence that is at least 50 percent identical to the nucleotide sequence of any one of the slr0688, the synpcc7942_1529, and the anacy_1623.

As a result, in the modified cyanobacterium, the gene encoding the cell wall-pyruvic acid modifying enzyme, represented by any one of SEQ ID NOs: 10 to 12 or a gene having a nucleotide sequence that is at least 50 percent identical to the nucleotide sequence of any one of these enzyme-encoding genes is deleted or inactivated. Hence, in the modified cyanobacterium, (i) the expression of any one of the cell wall-pyruvic acid modifying enzymes described above or a protein functionally equivalent to any one of these enzymes is suppressed, or (ii) the function of any one of the cell wall-pyruvic acid modifying enzymes described above or a protein functionally equivalent to any one of these enzymes is suppressed or lost. A covalently linked sugar chain on the surface of the cell wall is thereby less susceptible to modification with pyruvic acid, so that binding level and binding force of the sugar chain of the cell wall that binds to the SLH domain of the SLH domain-containing outer membrane protein in the outer membrane are reduced. As a result, in the modified cyanobacterium, a decreased amount of a sugar chain on cell wall that binds to the outer membrane is modified with pyruvic acid, so that binding force between the cell wall and the outer membrane is weakened. This facilitates partially detaching the outer membrane from the cell wall. As a result, protein and metabolites produced within the bacterial cell easily leak out to the outside of the bacterial cell, so that a plant growth promoting substance produced within the bacterial cell also easily leaks out to the outside of the bacterial cell. Thus, the plant growth promoter production method according to an aspect of the present disclosure can efficiently produce a plant growth promoter because the plant growth promoting substance produced within the bacterial cell of the modified cyanobacterium easily leaks out to the outside of the bacterial cell.

Furthermore, a plant growth promoter according to an aspect of the present disclosure includes: a secretion of a modified cyanobacterium in which a function of a protein involved in binding between an outer membrane and a cell wall of cyanobacterium is suppressed or lost.

As a result, the binding (i.e., binding level and binding force) between the cell wall and the outer membrane is partially reduced in the modified cyanobacterium. This facilitates partially detaching the outer membrane from the cell wall. Hence, in the modified cyanobacterium, protein and metabolites produced within the bacterial cell (i.e., intra-bacterial cell produced substances) easily leak out to the outside of the outer membrane (i.e., the outside of the bacterial cell). This facilitates secreting protein and metabolites produced within the bacterial cell of the modified cyanobacterium to the outside of the bacterial cell and therefore eliminates the need of extraction treatment of the intra-bacterial cell produced substances, for example, the disruption of the bacterial cell. Hence, a plant growth promoter containing a secretion of the modified cyanobacterium can be produced conveniently and efficiently. The intra-bacterial cell produced substances are less susceptible to reduction in physiological activity and yield because the extraction treatment of the intra-bacterial cell produced substances is unnecessary. Hence, a substance involved in promoting growth of a plant (hereinafter, also referred to as a plant growth promoting substance) among the intra-bacterial cell produced substances of the modified cyanobacterium is also less susceptible to reduction in physiological activity and yield. As a result, a plant growth promoter having an improved plant growth promoting effect can be obtained. Thus, the plant growth promoter according to an aspect of the present disclosure can effectively promote plant growth.

Furthermore, a plant growth promoting method according to an aspect of the present disclosure includes: using the above-described plant growth promoter.

The plant growth promoting method according to an aspect of the present disclosure uses a plant growth promoter having an improved plant growth promoting effect, and thus is capable of effectively promoting the growth of plants.

Hereinafter, embodiments will be described in detail with reference to the drawings.

It should be noted that each of the subsequently described embodiments shows a generic or specific example. Numerical values, materials, steps, the processing order of the steps indicated in the following embodiments are merely examples, and thus are not intended to limit the present disclosure. Furthermore, among the elements in the following embodiments, elements that are not described in the independent claims indicating the broadest concepts are described as optional elements.

Furthermore, the figures are not necessarily precise illustrations. In the figures, elements that are substantially the same are given the same reference signs, and overlapping description thereof may be omitted or simplified.

Moreover, in the following embodiments, numerical ranges include, not only the precise meanings, but also substantially equal ranges, such as, for example, a measured amount (for example, the number, the concentration, etc.) a protein or a range thereof, etc.

In the present specification, both of a bacterial cell and a cell refer to one individual of cyanobacterium.

Embodiment

In the present specification, the identity of a nucleotide sequence or an amino acid sequence is calculated with Basic Local Alignment Search Tool (BLAST) algorithm. Specifically, the identity is calculated by pairwise analysis with the BLAST program available in the website of the National Center for Biotechnology Information (NCBI) (https://blast.ncbi.nlm.nih.gov/Blast.cgi). Information on cyanobacterium genes and proteins encoded by these genes are published in, for example, the NCBI database mentioned above and Cyanobase (http://genome.microbedb.jp/cyanobase/). The amino acid sequence of the protein of interest and the nucleotide sequence of a gene encoding the protein can be obtained from these databases.

[1. Plant Growth Promoter]

First, the plant growth promoter according to the present embodiment will be described. The plant growth promoter contains a secretion involved in promoting growth of a plant, and has a plant growth promoting effect, for example, an effect of increasing the number of leaves, stems, buds, flowers, or fruits of a plant, thickening a stem or a trunk, and lengthening a height. The plant growth promoter may also have, for example, various effects related to promoting growth of a plant, for example, an effect of preventing the development of plant diseases, improving the rate of absorption of nutrients, or improving the intracellular physiological activity of a plant. Specifically, the phrase "involved in promoting growth of a plant" means having a plant growth promoting effect, and the plant growth promoting effect may include promoting growth of a plant by the various effects related to promoting growth of a plant as described above. As a result, the plant growth promoter promotes plant growth and increases plant yields.

In the present embodiment, the plant growth promoter comprises a secretion of a modified cyanobacterium in which a function of a protein involved in binding between an outer membrane and a cell wall of cyanobacterium (hereinafter, also referred to as parent cyanobacterium) is suppressed or lost. The cyanobacterium (i.e., parent cyanobacterium) and the modified cyanobacterium will be mentioned later.

As mentioned above, the secretion includes a secretion involved in promoting growth of a plant. The secretion contains protein and metabolites produced within the bacterial cell of the modified cyanobacterium (i.e., intra-bacterial cell produced substances). The intra-bacterial cell produced substances include a substance involved in promoting growth of a plant (hereinafter, also referred to as a plant growth promoting substance).

The plant growth promoting substance is, for example, an organic substance degrading enzyme such as peptidase, nuclease, or phosphatase, a DNA metabolism-related substance such as adenosine or guanosine, an intracellular molecule involved in the promotion of nucleic acid (e.g., DNA or RNA) synthesis, such as p-aminobenzoic acid or spermidine, a ketone such as 3-hydroxybutyric acid, or an organic acid such as gluconic acid. The secretion of the modified cyanobacterium may be a mixture of these plant growth promoting substances.

[2. Plant Growth Promoter Production Method]

Subsequently, the plant growth promoter production method according to the present embodiment will be described with reference to FIG. 1. FIG. 1 is a flow chart illustrating one example of the plant growth promoter production method according to the present embodiment.

The plant growth promoter production method according to the present embodiment comprises: preparing a modified cyanobacterium in which a function of a protein involved in binding between an outer membrane and a cell wall of cyanobacterium (i.e., parent cyanobacterium) is suppressed or lost (step S01); and causing the modified cyanobacteria to secrete a secretion involved in promoting growth of a plant (step S02). As mentioned above, the secretion of the modified cyanobacterium contains protein and metabolites produced within the bacterial cell of the modified cyanobacterium (i.e., intra-bacterial cell produced substances). These intra-bacterial cell produced substances include a substance involved in promoting growth of a plant (i.e., a plant growth promoting substance).

In step S01, the modified cyanobacterium described above is prepared. The preparing of a modified cyanobacterium refers to adjusting the state of the modified cyanobacterium to a state where the modified cyanobacterium can secrete a secretion. The preparing of a modified cyanobacterium may be, for example, preparing the modified cyanobacterium by genetically modifying the parent cyanobacterium, may be reconstructing a bacterial cell from a freeze-dried form or a glycerol stock of the modified cyanobacterium, or may be retrieving the modified cyanobacterium that has finished secreting a plant growth promoting substance in step S02.

In step S02, the modified cyanobacterium is caused to secrete a secretion involved in promoting growth of a plant. The modified cyanobacterium according to the present embodiment easily secretes protein and metabolites produced within the bacterial cell to the outside of the outer membrane (i.e., the outside of the bacterial cell) because a function of a protein involved in binding between an outer membrane and a cell wall of cyanobacterium (i.e., parent cyanobacterium) is suppressed or lost. These intra-bacterial cell produced substances also include a substance involved in promoting growth of a plant. Hence, in step S02, the modified cyanobacterium is cultured under predetermined conditions and thereby caused to secrete intra-bacterial cell produced substances involved in promoting growth of a plant to the outside of the bacterial cell.

Cyanobacterium culture can generally be carried out on the basis of liquid culture or a modified method thereof using a BG-11 medium (see Table 2). Hence, the culture of the modified cyanobacterium may be similarly carried out. The culture period of the cyanobacterium for plant growth promoter production can be a period during which protein and metabolites accumulate with a high concentration under conditions where the bacterial cell has proliferated sufficiently, and may be, for example, 1 to 3 days or may be 4 to 7 days. A culture method may be, for example, aeration and agitation culture or shake culture.

The modified cyanobacterium thus cultured under the conditions described above produces protein and metabolites (i.e., intra-bacterial cell produced substances) within the bacterial cell and secretes the intra-bacterial cell produced substances into the culture solution. The intra-bacterial cell produced substances include an intra-bacterial cell produced substance involved in promoting growth of a plant (i.e., a plant growth promoting substance). In the case of retrieving the intra-bacterial cell produced substances secreted in the culture solution, insoluble materials such as the cell (i.e., the bacterial cell) may be removed from the culture solution by the filtration or centrifugation, etc. of the culture solution to retrieve a culture supernatant. The plant growth promoter production method according to the present embodiment eliminates the need of disrupting the cell for plant growth promoting substance retrieval because a secretion containing an intra-bacterial cell produced substance involved in promoting growth of a plant (i.e., a plant growth promoting substance) is secreted to the outside of the cell of the modified cyanobacterium. Hence, the modified cyanobacterium remaining after plant growth promoting substance retrieval can be repeatedly used in plant growth promoter production.

The method for retrieving the plant growth promoting substance secreted into the culture solution is not limited to the example described above. While the modified cyanobacterium is cultured, the plant growth promoting substance in the culture solution may be retrieved. For example, a protein-permeable membrane may be used to retrieve a plant growth promoting substance that has passed through the permeable membrane. Thus, treatment to remove the bacterial cell of the modified cyanobacterium from a culture solution is unnecessary because, while the modified cyanobacterium is cultured, the plant growth promoting substance in the culture solution can be retrieved. Hence, the plant growth promoter can be produced more conveniently and efficiently.

Damage and stress on the modified cyanobacterium can be reduced because bacterial cell retrieval treatment from a culture solution and bacterial cell disruption treatment are unnecessary. Hence, the secretory productivity of a plant growth promoting substance is less likely to be reduced in the modified cyanobacterium, and the modified cyanobacterium can be used for a longer time.

Thus, use of the modified cyanobacterium according to the present embodiment enables a plant growth promoter to be obtained conveniently and efficiently.

Hereinafter, the cyanobacterium and the modified cyanobacterium will be described.

[3. Cyanobacterium]

Cyanobacterium, also called blue-green alga or blue-green bacterium, is a group of prokaryote that collects light energy through chlorophyll and performs photosynthesis while generating oxygen through the splitting of water using the obtained energy. Cyanobacterium is highly diverse and includes, for example, unicellular species such as *Synechocystis* sp. PCC 6803 and filamentous species having multicellular filaments such as *Anabaena* sp. PCC 7120, in terms of cell shape. There are also thermophilic species such as *Thermosynechococcus elongatus*, marine species such as *Synechococcus elongatus*, and freshwater species such as *Synechocystis*, in terms of growth environment. Other examples thereof include many species having unique features, including species, such as *Microcystis aeruginosa*, which have a gas vesicle and produce toxin, and *Gloeobacter violaceus* which lacks thylakoid and has a light-harvesting antenna protein called phycobilisome in the plasma membrane.

Figure 2:
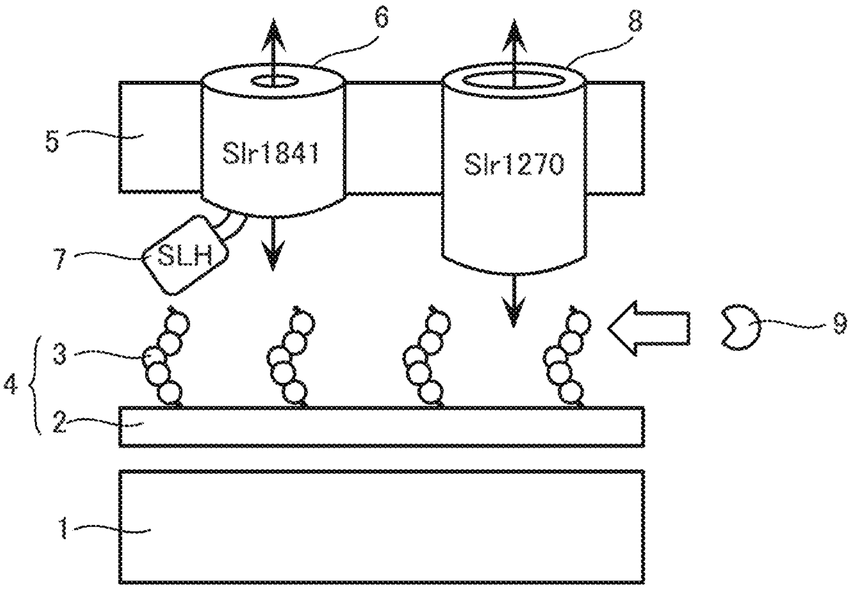
FIG. 2 is a diagram schematically illustrating a cell surface of a cyanobacterium.

FIG. 2 is a diagram schematically illustrating a cell surface of a cyanobacterium. As illustrated in FIG. 2, the cell surface of cyanobacterium is constituted by a plasma membrane (also referred to as inner membrane 1), peptidoglycan 2, and outer membrane 5 which is a lipid membrane that forms the outermost layer of the cell, in order from the inside. Sugar chain 3 constituted by glucosamine and mannosamine, etc. is covalently linked to peptidoglycan 2, and pyruvic acid is bound with this covalently linked sugar chain 3 (NPL 3: Jurgens and Weckesser, 1986, J. Bacteriol., 168: 568-573). In the present specification, peptidoglycan 2 and covalently linked sugar chain 3 are collectively referred to as cell wall 4. The space between the plasma membrane (i.e., inner membrane 1) and outer membrane 5 is called periplasm where various enzymes involved in protein degradation or conformation formation, lipid or nucleic acid degradation, or uptake of extracellular nutrients, etc. are present.

A SLH domain-containing outer membrane protein (e.g., Slr1841 in the figure) has a C-terminal region embedded in a lipid membrane (also referred to as outer membrane 5) and N-terminal SLH domain 7 projecting from the lipid membrane, and is widely distributed in cyanobacterium and bacteria belonging to the class Negativicutes, a group of Gram-negative bacteria (NPL 4: Kojima et al., 2016, Biosci. Biotech. Biochem., 10: 1954-1959). The region embedded in the lipid membrane (i.e., outer membrane 5) forms a channel that allows hydrophilic materials to permeate the outer membrane, whereas SLH domain 7 has a function of binding to cell wall 4 (NPL 5: Kowata et al., 2017, J. Bacteriol., 199: e00371-17). The binding of SLH domain 7 to cell wall 4 requires modifying covalently linked sugar chain 3 on peptidoglycan 2 with pyruvic acid (NPL 6: Kojima et al., 2016, J. Biol. Chem., 291: 20198-20209). Examples of the gene encoding SLH domain-containing outer membrane protein 6 include slr1841 and slr1908 retained by *Synechocystis* sp. PCC 6803, and oprB retained by *Anabaena* sp. 90.

An enzyme that catalyzes the pyruvic acid modification reaction of covalently linked sugar chain 3 (hereinafter, referred to as cell wall-pyruvic acid modifying enzyme 9) in peptidoglycan 2 was identified in a Gram-positive bacterium *Bacillus anthracis* and designated as CsaB (NPL 7: Mesnage et al., 2000, EMBO J., 19: 4473-4484). Many species of cyanobacterium whose genomic nucleotide sequence is published retains a gene encoding a homologous protein having an amino acid sequence that has 30% or higher identity to the amino acid sequence of CsaB. Examples thereof include slr0688 retained by *Synechocystis* sp. PCC 6803 and syn7502_03092 retained by *Synechococcus* sp. 7502.

In cyanobacterium, $CO_2$ fixed by photosynthesis is converted to various amino acids and precursors of intracellular molecules through multiple stages of enzymatic reaction.

Protein and metabolites are synthesized in the cytoplasm of cyanobacterium with these amino acids as starting materials. Such protein and metabolites include protein and metabolites that function in the cytoplasm and protein and metabolites that are transported from the cytoplasm to the periplasm and functions in the periplasm. However, any case where protein and metabolites are actively secreted to the outside of the cell has not been reported on cyanobacterium so far.

Cyanobacterium has high photosynthetic ability and therefore need not necessarily to take up organic substances as nutrients from the outside. Hence, cyanobacterium has only a very small amount of a channel protein, such as organic channel protein 8 (e.g., Slr1270) of FIG. 2, which permits permeation of organic substances, in outer membrane 5. For example, *Synechocystis* sp. PCC 6803 has only approximately 4% of organic channel protein 8 which permits permeation of organic substances based on the amount of total protein in outer membrane 5. On the other hand, outer membrane 5 of cyanobacterium is rich in an ion channel protein, such as SLH domain-containing outer membrane protein 6 (e.g., Slr1841) of FIG. 2, which permits selective permeation of only inorganic ions, for high-efficiency cellular uptake of inorganic ions necessary for growth. For example, in *Synechocystis* sp. PCC 6803, the ion channel protein which permits permeation of inorganic ions accounts for approximately 80% of the total protein of outer membrane 5.

Thus, cyanobacterium is considered to have the difficulty in actively secreting protein and metabolites produced within the bacterial cell to the outside of the bacterial cell, due to very few channels which permit permeation of organic substances such as protein in outer membrane 5.

[4. Modified Cyanobacterium]

Subsequently, the modified cyanobacterium according to the present embodiment will be described with reference to FIG. 2.

In the modified cyanobacterium according to the present embodiment, a function of a protein involved in binding between outer membrane 5 and cell wall 4 (hereinafter, also referred to as a binding-related protein) of cyanobacterium is suppressed or lost. As a result, the binding (e.g., binding level and binding force) between outer membrane 5 and cell wall 4 is partially reduced in the modified cyanobacterium. This facilitates partially detaching outer membrane 5 from cell wall 4. Hence, the modified cyanobacterium has improved secretory productivity of intra-bacterial cell produced substances to secrete protein and metabolites produced within the bacterial cell to the outside of the bacterial cell. As mentioned above, the intra-bacterial cell produced substances include an intra-bacterial cell produced substance involved in promoting growth of a plant (i.e., a plant growth promoting substance). Hence, the modified cyanobacterium also has improved secretory productivity of a plant growth promoting substance that is produced within the bacterial cell and secreted to the outside of the bacterial cell. Furthermore, the modified cyanobacterium eliminates the need of retrieving a plant growth promoting substance by disrupting the bacterial cell and can therefore be repeatedly used even after plant growth promoting substance retrieval. In the present specification, to make protein and metabolites within the bacterial cell by the modified cyanobacterium is referred to as production, and to secrete the produced protein and metabolites to the outside of the bacterial cell is referred to as secretory production.

The protein involved in binding between outer membrane 5 and cell wall 4 may be at least one of SLH domain-containing outer membrane protein 6 or cell wall-pyruvic acid modifying enzyme 9. In the present embodiment, in the modified cyanobacterium, for example, the function of at least one of SLH domain-containing outer membrane protein 6 or cell wall-pyruvic acid modifying enzyme 9 is suppressed or lost. For example, in the modified cyanobacterium, (i) the function of at least one of SLH domain-containing outer membrane protein 6 or cell wall-pyruvic acid modifying enzyme 9 may be suppressed or lost, or (i) at least one of the expression of SLH domain-containing outer membrane protein 6 which binds to cell wall 4 or an enzyme that catalyzes the pyruvic acid modification reaction of a linked sugar chain on the surface of cell wall 4 (i.e., cell wall-pyruvic acid modifying enzyme 9) may be suppressed. As a result, the binding (e.g., binding level and binding force) between SLH domain 7 of SLH domain-containing outer membrane protein 6 in outer membrane 5 and covalently linked sugar chain 3 on the surface of cell wall 4 is reduced. Hence, outer membrane 5 is easily detached from cell wall 4 at a site having the weakened binding therebetween. Owing to partial detachment of outer membrane 5 from cell wall 4, intra-bacterial cell produced substances such as protein and metabolites present in the cell, particularly, the periplasm, of the modified cyanobacterium easily leaks out to the outside of the cell (outside of outer membrane 5). Accordingly, the modified cyanobacterium has improved secretory productivity of a plant growth promoting substance that is produced within the bacterial cell and secreted to the outside of the bacterial cell.

Hereinafter, a cyanobacterium modified so as to partially detach outer membrane 5 from cell wall 4 by suppressing a function of at least one binding-related protein of SLH domain-containing outer membrane protein 6 and cell wall-pyruvic acid modifying enzyme 9 will be specifically described.

The type of the cyanobacterium before at least one of the expression of SLH domain-containing outer membrane protein 6 or the expression of cell wall-pyruvic acid modifying enzyme 9 is suppressed or lost (i.e., a parent cyanobacterium), which serves as the parent microbe of the modified cyanobacterium in the present embodiment, is not particularly limited and may be any type of cyanobacterium. The parent cyanobacterium may be, for example, the genus *Synechocystis, Synechococcus, Anabaena*, or *Thermosynechococcus*, and may be *Synechocystis* sp. PCC 6803*, Synechococcus* sp. PCC 7942, or *Thermosynechococcus elongatus* BP-1 among them.

The amino acid sequences of SLH domain-containing outer membrane protein 6 and the enzyme that catalyzes the pyruvic acid modification reaction of the cell wall (i.e., cell wall-pyruvic acid modifying enzyme 9) in the parent cyanobacterium, the nucleotide sequences of genes encoding these binding-related proteins, and the positions of the genes on chromosomal DNA or a plasmid can be confirmed in the NCBI database and Cyanobase mentioned above.

SLH domain-containing outer membrane protein 6 or cell wall-pyruvic acid modifying enzyme 9, the function of which is suppressed or lost in the modified cyanobacterium according to the present embodiment may be from any parent cyanobacterium and is not limited by the location where a gene encoding it resides (e.g., on chromosomal DNA or on a plasmid) as long as the parent cyanobacterium carries it.

SLH domain-containing outer membrane protein 6 may be, for example, Slr1841, Slr1908, or Slr0042 when the parent cyanobacterium is the genus *Synechocystis*, may be NIES970_09470, etc. when the parent cyanobacterium is the genus *Synechococcus*, may be Anacy_5815 or Anacy_3458, etc. when the parent cyanobacterium is the genus *Anabaena*, may be A0A0F6U6F8_MICAE, etc. when the parent cyanobacterium is the genus *Microcystis*, may be A0A3B8XX12_9CYAN, etc. when the parent cyanobacterium is the genus Cyanothece, may be A0A1Q8ZE23_9CYAN, etc. when the parent cyanobacterium is the genus *Leptolyngbya*, includes A0A1Z4R6U0_9CYAN when the parent cyanobacterium is the genus Calothrix, may be A0A1C0VG86_9NOSO, etc. when the parent cyanobacterium is the genus *Nostoc*, may be B1WRN6_CROSS, etc. when the parent cyanobacterium is the genus *Crocosphaera*, and may be K9TAE4_9CYAN, etc. when the parent cyanobacterium is the genus *Pleurocapsa.*

More specifically, SLH domain-containing outer membrane protein 6 may be, for example, Slr1841 (SEQ ID NO: 1) of *Synechocystis* sp. PCC 6803, NIES970_09470 (SEQ ID NO: 2) of *Synechococcus* sp. NIES-970, or Anacy_3458 (SEQ ID NO: 3) of *Anabaena cylindrica* PCC 7122. Alternatively, a protein having an amino acid sequence that is at least 50 percent identical to the amino acid sequence of any one of these SLH domain-containing outer membrane proteins 6 may be used.

As a result, in the modified cyanobacterium, for example, (i) the function of SLH domain-containing outer membrane protein 6 represented by any one of SEQ ID NOs: 1 to 3 or a protein having an amino acid sequence that is at least 50 percent identical to the amino acid sequence of any one of these SLH domain-containing outer membrane proteins 6 may be suppressed or lost, or (ii) the expression of SLH domain-containing outer membrane protein 6 represented by any one of SEQ ID NOs: 1 to 3 or a protein having an amino acid sequence that is at least 50 percent identical to the amino acid sequence of any one of these SLH domain-containing outer membrane proteins 6 may be suppressed. Hence, in the modified cyanobacterium, (i) the function of SLH domain-containing outer membrane protein 6 or a protein functionally equivalent to SLH domain-containing outer membrane protein 6 in outer membrane 5 is suppressed or lost, or (ii) the expression level of SLH domain-containing outer membrane protein 6 or a protein functionally equivalent to SLH domain-containing outer membrane protein 6 in outer membrane 5 is decreased. As a result, in the modified cyanobacterium, the binding level and binding force with which a binding domain (e.g., SLH domain 7) for binding outer membrane 5 with cell wall 4 binds to cell wall 4 are reduced. This facilitates partially detaching outer membrane 5 from cell wall 4. As a result, in the modified cyanobacterium, intra-bacterial cell produced substances easily leak out to the outside of the bacterial cell, so that a plant growth promoting substance produced within the bacterial cell also easily leaks out to the outside of the bacterial cell.

In general, a protein having an amino acid sequence that is at least 30 percent identical to the amino acid sequence of a protein has high conformational homology to the protein and therefore, is reportedly likely to be functionally equivalent to the protein. Hence, SLH domain-containing outer membrane protein 6, the function of which is suppressed or lost may be, for example, a protein or a polypeptide which has an amino acid sequence that has 40% or higher, preferably 50% or higher, more preferably 60% or higher, further preferably 70% or higher, still further preferably 80% or higher, even further preferably 90% or higher identity to the amino acid sequence of SLH domain-containing outer membrane protein 6 represented by any one of SEQ ID NOs: 1 to 3, and which has a function of binding to covalently linked sugar chain 3 of cell wall 4.

Cell wall-pyruvic acid modifying enzyme 9 may be, for example, Slr0688 when the parent cyanobacterium is the genus *Synechocystis*, may be Syn7502_03092 or Synpcc7942_1529, etc. when the parent cyanobacterium is the genus *Synechococcus*, may be ANA_C20348 or Anacy_1623, etc. when the parent cyanobacterium is the genus *Anabaena*, may be CsaB (NCBI accession ID: TRU80220), etc. when the parent cyanobacterium is the genus *Microcystis*, may be CsaB (NCBI accession ID: WP_107667006.1), etc. when the parent cyanobacterium is the genus Cyanothece, may be CsaB (NCBI accession ID: WP_026079530.1), etc. when the parent cyanobacterium is the genus *Spirulina*, may be CsaB (NCBI accession ID: WP_096658142.1), etc. when the parent cyanobacterium is the genus Calothrix, may be CsaB (NCBI accession ID: WP_099068528.1), etc. when the parent cyanobacterium is the genus *Nostoc*, may be CsaB (NCBI accession ID: WP_012361697.1), etc. when the parent cyanobacterium is the genus *Crocosphaera*, and may be CsaB (NCBI accession ID: WP_036798735), etc. when the parent cyanobacterium is the genus *Pleurocapsa.*

More specifically, cell wall-pyruvic acid modifying enzyme 9 may be, for example, Slr0688 (SEQ ID NO: 4) of *Synechocystis* sp. PCC 6803, Synpcc7942_1529 (SEQ ID NO: 5) of *Synechococcus* sp. PCC 7942, or Anacy_1623 (SEQ ID NO: 6) of *Anabaena cylindrica* PCC 7122. Alternatively, a protein having an amino acid sequence that is at least 50 percent identical to the amino acid sequence of any one of these cell wall-pyruvic acid modifying enzymes 9 may be used.

As a result, in the modified cyanobacterium, for example, (i) the function of cell wall-pyruvic acid modifying enzyme 9 represented by any one of SEQ ID NOs: 4 to 6 or a protein having an amino acid sequence that is at least 50 percent identical to the amino acid sequence of any one of these cell wall-pyruvic acid modifying enzymes 9 may be suppressed or lost, or (ii) the expression of cell wall-pyruvic acid modifying enzyme 9 represented by any one of SEQ ID NOs: 4 to 6 or a protein having an amino acid sequence that is at least 50 percent identical to the amino acid sequence of any one of these cell wall-pyruvic acid modifying enzymes 9 may be suppressed. Hence, in the modified cyanobacterium, (i) the function of cell wall-pyruvic acid modifying enzyme 9 or a protein functionally equivalent to the enzyme is suppressed or lost, or (ii) the expression level of cell wall-pyruvic acid modifying enzyme 9 or a protein functionally equivalent to the enzyme is decreased. Covalently linked sugar chain 3 on the surface of cell wall 4 is thereby less susceptible to modification with pyruvic acid, so that binding level and binding force of sugar chain 3 of cell wall 4 that binds to SLH domain 7 of SLH domain-containing outer membrane protein 6 in outer membrane 5 are reduced. Therefore, in the modified cyanobacterium according to the present embodiment, covalently linked sugar chain 3 on the surface of cell wall 4 is less susceptible to modification with pyruvic acid, so that binding force between cell wall 4 and outer membrane 5 is weakened. This facilitates partially detaching outer membrane 5 from cell wall 4. As a result, in the modified cyanobacterium, intra-bacterial cell produced substances easily leak out to the outside of the bacterial cell, so that a plant growth promoting substance produced within the bacterial cell also easily leaks out to the outside of the bacterial cell.

As mentioned above, a protein having an amino acid sequence that is at least 30 percent identical to the amino acid sequence of a protein is reportedly likely to be functionally equivalent to the protein. Hence, cell wall-pyruvic acid modifying enzyme 9, the function of which is suppressed or lost may be, for example, a protein or a polypeptide which has an amino acid sequence that has 40% or higher, preferably 50% or higher, more preferably 60% or higher, further preferably 70% or higher, still further preferably 80% or higher, even further preferably 90% or higher identity to the amino acid sequence of cell wall-pyruvic acid modifying enzyme 9 represented by any one of SEQ ID NOs: 4 to 6, and which has a function of catalyzing reaction to modify covalently linked sugar chain 3 on peptidoglycan 2 of cell wall 4 with pyruvic acid.

In the present specification, the phrase "a function of SLH domain-containing outer membrane protein 6 is suppressed or lost" means that the ability of the protein to bind to cell wall 4 is suppressed or lost, the transport of the protein to outer membrane 5 is suppressed or lost, or the ability of the protein to be embedded so as to function in outer membrane 5 is suppressed or lost.

The phrase "a function of cell wall-pyruvic acid modifying enzyme 9 is suppressed or lost" means that the function of modifying covalently linked sugar chain 3 of cell wall 4 with pyruvic acid by the protein is suppressed or lost.

An approach for suppressing or losing the functions of these proteins is not particularly limited as long as the approach is usually used for suppressing or losing protein functions. The approach may involve, for example, deleting or inactivating a gene encoding SLH domain-containing outer membrane protein 6 and a gene encoding cell wall-pyruvic acid modifying enzyme 9, inhibiting the transcription of these genes, inhibiting the translation of transcripts of these genes, or administrating inhibitors which specifically inhibit these proteins.

In the present embodiment, in the modified cyanobacterium, the gene which causes expression of the protein involved in the binding between outer membrane 5 and cell wall 4 is deleted or inactivated. Accordingly, in the modified cyanobacterium, the expression of the protein involved in the binding between cell wall 4 and outer membrane 5 is suppressed, or the function of the protein is suppressed or lost. Therefore, the binding (i.e., binding level and binding force) between cell wall 4 and outer membrane 5 is partially reduced. As a result, in the modified cyanobacterium, outer membrane 5 is easy to partially detach from cell wall 4, so that intra-bacterial cell produced substances such as protein and metabolites produced within the bacterial cell of the modified cyanobacterium easily leak out to the outside of outer membrane 5, i.e., the outside of the bacterial cell. Hence, the modified cyanobacterium has improved secretory productivity of a plant growth promoting substance that is produced within the bacterial cell and secreted to the outside of the bacterial cell. This eliminates the need of extraction treatment of the intra-bacterial cell produced substances, such as the disruption of the bacterial cell. Therefore, the intra-bacterial cell produced substances are less susceptible to reduction in physiological activity and yield. Hence, a plant growth promoting substance produced within the bacterial cell is also less susceptible to reduction in physiological activity and yield. Therefore, a plant growth promoter having an improved plant growth promoting effect can be produced. The plant growth promoting substance can be produced by repeatedly using the modified cyanobacterium even after retrieval of the intra-bacterial cell produced substances because the extraction treatment of the intra-bacterial cell produced substances is unnecessary.

The gene which causes expression of the protein involved in binding between outer membrane 5 and cell wall 4 may be, for example, at least one of a gene encoding SLH domain-containing outer membrane protein 6 or a gene encoding cell wall-pyruvic acid modifying enzyme 9. In the modified cyanobacterium, at least one of the gene encoding SLH domain-containing outer membrane protein 6 or the gene encoding cell wall-pyruvic acid modifying enzyme 9 is deleted or inactivated. Hence, in the modified cyanobacterium, for example, (i) the expression of at least one of SLH domain-containing outer membrane protein 6 or cell wall-pyruvic acid modifying enzyme 9 is suppressed, or (ii) the function of at least one of SLH domain-containing outer membrane protein 6 or cell wall-pyruvic acid modifying enzyme 9 is suppressed or lost. Hence, the binding (i.e., binding level and binding force) between SLH domain 7 of SLH domain-containing outer membrane protein 6 in outer membrane 5 and covalently linked sugar chain 3 on the surface of cell wall 4 is reduced. As a result, outer membrane 5 is easily detached from cell wall 4 at a site having the weakened binding between outer membrane 5 and cell wall 4. As a result, in the modified cyanobacterium, protein produced within the bacterial cell easily leaks out to the outside of the bacterial cell because outer membrane 5 is easy to partially detach from cell wall 4 by the weakened binding between outer membrane 5 and cell wall 4. As a result, a plant growth promoting substance produced within the bacterial cell of the modified cyanobacterium also easily leaks out to the outside of the bacterial cell.

In the present embodiment, for example, the transcription of at least one of the gene encoding SLH domain-containing outer membrane protein 6 or the gene encoding cell wall-pyruvic acid modifying enzyme 9 may be suppressed in order to suppress or lose the function of at least one of SLH domain-containing outer membrane protein 6 or cell wall-pyruvic acid modifying enzyme 9 in cyanobacterium.

The gene encoding SLH domain-containing outer membrane protein 6 may be, for example, slr1841, slr1908, or slr0042 when the parent cyanobacterium is the genus *Synechocystis*, may be nies970_09470, etc. in the case of the genus *Synechococcus*, may be anacy_5815 or anacy_3458, etc. when the parent cyanobacterium is the genus *Anabaena*, may be A0A0F6U6F8_MICAE, etc. when the parent cyanobacterium is the genus *Microcystis*, may be A0A3B8XX12_9CYAN, etc. when the parent cyanobacterium is the genus Cyanothece, may be A0A1Q8ZE23_9CYAN, etc. when the parent cyanobacterium is the genus *Leptolyngbya*, may be A0A1Z4R6U0_9CYAN, etc. when the parent cyanobacterium is the genus Calothrix, may be A0A1C0VG86_9NOSO, etc. when the parent cyanobacterium is the genus *Nostoc*, may be B1WRN6_CROS5, etc. when the parent cyanobacterium is the genus *Crocosphaera*, and may be K9TAE4_9CYAN, etc. when the parent cyanobacterium is the genus *Pleurocapsa*. The nucleotide sequences of these genes can be obtained from the NCBI database or Cyanobase mentioned above.

More specifically, the gene encoding SLH domain-containing outer membrane protein 6 may be slr1841 (SEQ ID NO: 7) of *Synechocystis* sp. PCC 6803, nies970_09470 (SEQ ID NO: 8) of *Synechococcus* sp. NIES-970, anacy_3458 (SEQ ID NO: 9) of *Anabaena cylindrica* PCC 7122, or a gene having an amino acid sequence that is at least 50 percent identical to the amino acid sequence of any one of these genes.

As a result, in the modified cyanobacterium, the gene encoding SLH domain-containing outer membrane protein 6, represented by any one of SEQ ID NOs: 7 to 9 or a gene having a nucleotide sequence that is at least 50 percent identical to the nucleotide sequence of any one of these genes is deleted or inactivated. Hence, in the modified cyanobacterium, (i) the expression of any one of SLH domain-containing outer membrane proteins 6 described above or a protein functionally equivalent to any one of these proteins is suppressed, or (ii) the function of any one of SLH domain-containing outer membrane proteins 6 described above or a protein functionally equivalent to any one of these proteins is suppressed or lost. As a result, in the modified cyanobacterium, the binding level and binding force of a cell wall 4 binding domain (e.g., SLH domain 7) of outer membrane 5 that binds to cell wall 4 are reduced. This facilitates partially detaching outer membrane 5 from cell wall 4. As a result, protein and metabolites produced within the bacterial cell easily leak out to the outside of the bacterial cell, so that a plant growth promoting substance produced within the bacterial cell also easily leaks out to the outside of the bacterial cell.

As mentioned above, a protein having an amino acid sequence that is at least 30 percent identical to the amino acid sequence of a protein is reportedly likely to be functionally equivalent to the protein. Hence, a gene having a nucleotide sequence that is at least 30 percent identical to the nucleotide sequence of a gene encoding a protein is considered likely to cause expression of a protein functionally equivalent to the protein. Hence, the gene encoding SLH domain-containing outer membrane protein 6, the function of which is suppressed or lost may be, for example, a gene which has a nucleotide sequence that has 40% or higher, preferably 50% or higher, more preferably 60% or higher, further preferably 70% or higher, still further preferably 80% or higher, even further preferably 90% or higher identity to the nucleotide sequence of the gene encoding SLH domain-containing outer membrane protein 6 represented by any one of SEQ ID NOs: 7 to 9, and which encodes a protein or a polypeptide having a function of binding to covalently linked sugar chain 3 of cell wall 4.

The gene encoding cell wall-pyruvic acid modifying enzyme 9 may be, for example, slr0688 when the parent cyanobacterium is the genus *Synechocystis*, may be syn7502_03092 or synpcc7942_1529, etc. when the parent cyanobacterium is the genus *Synechococcus*, may be ana_C20348 or anacy_1623, etc. when the parent cyanobacterium is the genus *Anabaena*, may be csaB (NCBI accession ID: TRU80220), etc. when the parent cyanobacterium is the genus *Microcystis*, may be csaB (NCBI accession ID: WP_107667006.1), etc. when the parent cyanobacterium is the genus Cyanothece, may be csaB (NCBI accession ID:WP_026079530.1), etc. when the parent cyanobacterium is the genus *Spirulina*, may be csaB (NCBI accession ID:WP_096658142.1), etc. when the parent cyanobacterium is the genus Calothrix, may be csaB (NCBI accession ID:WP_099068528.1), etc. when the parent cyanobacterium is the genus *Nostoc*, may be csaB (NCBI accession ID: WP_012361697.1), etc. when the parent cyanobacterium is the genus *Crocosphaera*, and may be csaB (NCBI accession ID: WP_036798735), etc. when the parent cyanobacterium is the genus *Pleurocapsa*. The nucleotide sequences of these genes can be obtained from the NCBI database or Cyanobase mentioned above.

More specifically, the gene encoding cell wall-pyruvic acid modifying enzyme 9 may be slr0688 (SEQ ID NO: 10) of *Synechocystis* sp. PCC 6803, synpcc7942_1529 (SEQ ID NO: 11) of *Synechococcus* sp. PCC 7942, or anacy_1623 (SEQ ID NO: 12) of *Anabaena cylindrica* PCC 7122. Alternatively, a gene having a nucleotide sequence that is at least 50 percent identical to the nucleotide sequence of any one of these genes may be used.

As a result, in the modified cyanobacterium, the gene encoding cell wall-pyruvic acid modifying enzyme 9, represented by any one of SEQ ID NOs: 10 to 12 or a gene having a nucleotide sequence that is at least 50 percent identical to the nucleotide sequence of any one of these enzyme-encoding genes is deleted or inactivated. Hence, in the modified cyanobacterium, (i) the expression of any one of cell wall-pyruvic acid modifying enzymes 9 described above or a protein functionally equivalent to any one of these enzymes is suppressed, or (ii) the function of any one of cell wall-pyruvic acid modifying enzymes 9 described above or a protein functionally equivalent to any one of these enzymes is suppressed or lost. Covalently linked sugar chain 3 on the surface of cell wall 4 is thereby less susceptible to modification with pyruvic acid, so that binding level and binding force of sugar chain 3 of cell wall 4 that binds to SLH domain 7 of SLH domain-containing outer membrane protein 6 in outer membrane 5 are reduced. Thus, in the modified cyanobacterium according to the present embodiment, a decreased amount of sugar chain 3 on cell wall 4 that binds to outer membrane 5 is modified with pyruvic acid, so that binding force between cell wall 4 and outer membrane 5 is weakened. This facilitates partially detaching outer membrane 5 from cell wall 4. As a result, protein and metabolites produced within the bacterial cell easily leak out to the outside of the bacterial cell, so that a plant growth promoting substance produced within the bacterial cell also easily leaks out to the outside of the bacterial cell.

As mentioned above, a gene having a nucleotide sequence that is at least 30 percent identical to the nucleotide sequence of a gene encoding a protein is considered likely to cause expression of a protein functionally equivalent to the protein. Hence, the gene encoding cell wall-pyruvic acid modifying enzyme 9, the function of which is suppressed or lost may be, for example, a gene which has a nucleotide sequence that has 40% or higher, preferably 50% or higher, more preferably 60% or higher, further preferably 70% or higher, still further preferably 80% or higher, even further preferably 90% or higher identity to the nucleotide sequence of the gene encoding cell wall-pyruvic acid modifying enzyme 9 represented by any one of SEQ ID NOs: 10 to 12, and which encodes a protein or a polypeptide having a function of catalyzing reaction to modify covalently linked sugar chain 3 on peptidoglycan 2 of cell wall 4 with pyruvic acid.

[5. Modified Cyanobacterium Production Method]

Subsequently, the modified cyanobacterium production method according to the present embodiment will be described. The modified cyanobacterium production method comprises causing a function of a protein involved in binding between outer membrane 5 and cell wall 4 of cyanobacterium to be suppressed or lost.

In the present embodiment, in the (i), the protein involved in binding between outer membrane 5 and cell wall 4 may be, for example, at least one of SLH domain-containing outer membrane protein 6 or cell wall-pyruvic acid modifying enzyme 9.

An approach for suppressing or losing the function of the protein is not particularly limited and may involve, for example, deleting or inactivating a gene encoding SLH domain-containing outer membrane protein 6 and a gene encoding cell wall-pyruvic acid modifying enzyme 9, inhibiting the transcription of these genes, inhibiting the translation of transcripts of these genes, or administrating inhibitors which specifically inhibit these proteins.

An approach for deleting or inactivating the gene may be, for example, the mutagenesis of one or more bases on the nucleotide sequence of the gene, the substitution of the nucleotide sequence by another nucleotide sequence, the insertion of another nucleotide sequence thereto, or the partial or complete deletion of the nucleotide sequence of the gene.

An approach for inhibiting the transcription of the gene may be, for example, the mutagenesis of a promoter region of the gene, the inactivation of the promoter by substitution by another nucleotide sequence or insertion of another nucleotide sequence, or CRISPR interference (NPL 8: Yao et al., ACS Synth. Biol., 2016, 5: 207-212). A specific approach for the mutagenesis or the substitution by or insertion of a nucleotide sequence may be, for example, ultraviolet irradiation, site-directed mutagenesis, or homologous recombination.

An approach for inhibiting the translation of a transcript of the gene may be, for example, RNA (ribonucleic acid) interference.

The function of the protein involved in binding between outer membrane 5 and cell wall 4 of cyanobacterium may be suppressed or lost to produce the modified cyanobacterium by use of any one of the above approaches.

As a result, the binding (e.g., binding level and binding force) between cell wall 4 and outer membrane 5 is partially reduced in the modified cyanobacterium produced by the production method described above. This facilitates partially detaching outer membrane 5 from cell wall 4. As a result, in the modified cyanobacterium, intra-bacterial cell produced substances such as protein and metabolites produced within the bacterial cell easily leak out to the outside of outer membrane 5 (i.e., the outside of the bacterial cell), so that a substance involved in promoting growth of a plant (i.e., a plant growth promoting substance) also easily leaks out to the outside of the bacterial cell. Thus, the modified cyanobacterium production method according to the present embodiment can provide a modified cyanobacterium having improved secretory productivity of a plant growth promoting substance.

The modified cyanobacterium produced by the production method in the present embodiment eliminates the need of disrupting the bacterial cell for plant growth promoting substance retrieval because plant growth promoting substance produced within the bacterial cell easily leaks out to the outside of the bacterial cell. For example, the modified cyanobacterium can be cultured under appropriate conditions, and subsequently, plant growth promoting substance secreted into the culture solution can be retrieved. Therefore, while the modified cyanobacterium is cultured, the plant growth promoting substance in the culture solution may be retrieved. Hence, use of the modified cyanobacterium obtained by this production method enables efficient microbiological plant growth promoting substance production to be carried out. Thus, the modified cyanobacterium production method in the present embodiment can provide a modified cyanobacterium with high use efficiency that can be repeatedly used even after plant growth promoting substance retrieval.

[6. Plant Growth Promoting Method]

The plant growth promoting method according to the present embodiment comprises using the plant growth promoter described above. As mentioned above, use of the plant growth promoter can effectively promote plant growth because the plant growth promoter according to the present embodiment is a plant growth promoter having an improved plant growth promoting effect.

The plant growth promoter described above may be used as it is, as a matter of course, or may be used after being concentrated or diluted. For the application of the plant growth promoter to a plant, the concentration and application method of the plant growth promoter may be appropriately determined according to the type of the plant, the properties of soil, and purpose, etc. The plant growth promoter may be, for example, a culture solution itself of the modified cyanobacterium, may be a solution obtained by removing the bacterial cell of the modified cyanobacterium from the culture solution, or may be extracts obtained by extracting a desired substance from the culture solution by a membrane technique or the like. The desired substance may be an enzyme that degrades nutrients in soil, may be a substance (e.g., a substance having a chelating effect) that solubilizes an insoluble substance (e.g., a metal such as iron) in soil, or may be a substance that improves the intracellular physiological activity of a plant. The method for applying the plant growth promoter to a plant may be, for example, spraying, irrigation, or mixing to the plant or soil. More specifically, several mL per plant individual may be added to the base of the plant approximately once a week.

WORKING EXAMPLES

Hereinafter, the modified cyanobacterium, the modified cyanobacterium production method, and the plant growth promoter production method of the present disclosure will be specifically described with reference to working examples. However, the present disclosure is not limited by the following working examples by any means.

In the following working examples, two types of modified cyanobacteria were produced by suppressing the expression of slr1841 gene encoding a SLH domain-containing outer membrane protein (Example 1) and suppressing the expression of slr0688 gene encoding a cell wall-pyruvic acid modifying enzyme (Example 2) as methods for partially detaching the outer membrane of cyanobacterium from the cell wall. Then, the measurement of secretory productivity of protein and the identification of the secreted intra-bacterial cell produced substances (here, protein and intracellular metabolites) were performed as to these modified cyanobacteria. The cyanobacterium species used in the present working examples is *Synechocystis* sp. PCC 6803 (hereinafter, simply referred to as "cyanobacterium").

Working Example 1

In Example 1, a modified cyanobacterium was produced in which the expression of slr1841 gene encoding a SLH domain-containing outer membrane protein was suppressed.

(1) Construction of Modified Cyanobacterium Strain in which Expression of slr1841 Gene was Suppressed The gene expression suppression method used was CRISPR (Clustered Regularly Interspaced Short Palindromic Repeat) interference. In this method, the expression of the slr1841 gene can be suppressed by introducing a gene encoding dCas9 protein (hereinafter, referred to as dCas9 gene) and slr1841_sgRNA (single-guide ribonucleic acid) gene to the chromosomal DNA of cyanobacterium.

The mechanism of the suppression of gene expression by this method is as follows.

First, nuclease activity-deficient Cas9 protein (dCas9) and sgRNA (slr1841_sgRNA) complementarily binding to the nucleotide sequence of the slr1841 gene forms a complex.

Next, this complex recognizes the slr1841 gene on the chromosomal DNA of cyanobacterium and specifically binds to the slr1841 gene. This binding, which serves as steric hindrance, inhibits the transcription of the slr1841 gene. As a result, the expression of the slr1841 gene in the cyanobacterium is suppressed.

Hereinafter, a method for introducing each of the two genes described above to the chromosomal DNA of cyanobacterium will be specifically described.

(1-1) Introduction of dCas9 Gene

The dCas9 gene, operator gene for the expression control of the dCas9 gene, and spectinomycin resistance marker gene serving as an indicator for gene introduction were amplified by PCR (polymerase chain reaction) with the chromosomal DNA of a *Synechocystis* LY07 strain (hereinafter, also referred to as an LY07 strain) (see NPL 8) as a template using the primers psbA1-Fw (SEQ ID NO: 13) and psbA1-Rv (SEQ ID NO: 14) described in Table 1. In the LY07 strain, these three genes are inserted in a linked state in psbA1 gene on the chromosomal DNA and can therefore be amplified as one DNA fragment by PCR. Here, the obtained DNA fragment is referred to as a "psbA1::dCas9 cassette". The psbA1::dCas9 cassette was inserted to a pUC19 plasmid by use of In-Fusion PCR Cloning® to obtain a pUC19-dCas9 plasmid.

TABLE 2-continued

| Component | Content (mg/L) |
|---|---|
| $CaCl_2$ | 28.6 |
| $H_3BO_4$ | 2.8 |
| $MnCl_2$ | 1.8 |
| $ZnSO_4$ | 0.2 |
| $CuSO_4$ | 0.08 |
| $Na_2MoO_4$ | 0.02 |
| $Co(NO_3)_2$ | 0.005 |
| TES-KOH (pH 7.5) | 4580 |

(1-2) Introduction of slr1841_sgRNA Gene

In the CRISPR interference, sgRNA specifically binds to a target gene by introducing a sequence of approximately 20 bases complementary to the target sequence to a region called protospacer on the sgRNA gene. The protospacer sequence used in the present working examples is described in Table 3.

TABLE 1

| Primer name | Nucleotide sequence | SEQ ID NO |
|---|---|---|
| psbA1-Fw | 5' -CAGTGAATTCGAGCTCGGTATATAGCGTTGCAGTCCCTGG-3' | 13 |
| psbA1-Rv | 5' -GATTACGCCAAGCTTGCATGACCGCGGTCACTTCATAACC-3' | 14 |
| slr2030-Fw | 5' -CAGTGAATTCGAGCTCGGTAATAACCGTTGTCCCTTTTGTTTCATCG-3' | 15 |
| sgRNA_slr1841-Rv | 5' -TGTTAGTGAGCCCTGCTGTTAGCTCCCAGTATCTCTATCACTGAT-3' | 16 |
| sgRNA_slr1841-Fw | 5' -ACAGGAGGGCTCACTAACAGTTTTAGAGCTAGAAATAGCAAGTTAAAATAA-3' | 17 |
| slr2031-Rv | 5' -GATTACGCCAAGCTTGCATGGGGAACAAGCTGAATCTGGGCATC-3' | 18 |
| sgRNA_slr0688-Rv | 5' -TTTTAGTCTGTTTGCTGCATAGCTCCCAGTATCTCTATCACTGAT-3' | 19 |
| sgRNA_slr0688-Fw | 5' -TGCAGCAAACAGACTAAAAGTTTTAGAGCTAGAAATAGCAAGTTAAAATAA-3' | 20 |

1 μg of the obtained pUC19-dCas9 plasmid and a cyanobacterium culture solution (bacterial cell concentration OD730=approximately 0.5) were mixed, and the pUC19-dCas9 plasmid was introduced into the cyanobacterium cells by spontaneous transformation. The transformed cells were selected by growth on a BG-11 agar medium containing 20 μg/mL spectinomycin. In the selected cells, homologous recombination occurred between the psbA1 gene on the chromosomal DNA and the upstream and downstream fragment regions of psbA1 on the pUC19-dCas9 plasmid. In this way, a *Synechocystis* dCas9 strain having the insert of the dCas9 cassette in the psbA1 gene region was obtained. The composition of the BG-11 medium used is as described in Table 2.

TABLE 2

| Component | Content (mg/L) |
|---|---|
| EDTA-Na | 1 |
| Ammonium Iron Citrate | 6 |
| $NaNO_3$ | 1500 |
| $MgSO_4$ | 75 |
| $K_2HPO_4$ | 39 |

TABLE 3

| Protospacer target gene | Nucleotide sequence | SEQ ID NO |
|---|---|---|
| slr1841 | 5' -ACAGCAGGGCTCACTAACA-3' | 21 |
| slr0688 | 5' -TGCAGCAAACAGACTAAAA-3' | 22 |

In the *Synechocystis* LY07 strain, the sgRNA gene (except for the protospacer region) and kanamycin resistance marker gene are inserted in a linked state in slr2030-slr2031 genes on the chromosomal DNA. Thus, sgRNA that specifically recognizes slr1841 (slr1841_sgRNA) can be easily obtained by adding a protospacer sequence (SEQ ID NO: 21) complementary to the slr1841 gene (SEQ ID NO: 7) to primers for use in amplifying the sgRNA gene by PCR.

First, two DNA fragments were amplified by PCR with the chromosomal DNA of the LY07 strain as a template using a set of the primers slr2030-Fw (SEQ ID NO: 15) and sgRNA_slr1841-Rv (SEQ ID NO: 16) and a set of the primers sgRNA_slr1841-Fw (SEQ ID NO: 17) and slr2031-Rv (SEQ ID NO: 18) descried in Table 1.

Subsequently, a DNA fragment (slr2030-2031::slr1841_sgRNA) having (i) the slr2030 gene fragment, (ii)

slr1841_sgRNA, (iii) kanamycin resistance marker gene, and (iv) the slr2031 gene fragment linked in order was obtained by PCR amplification with a mixed solution of the DNA fragments described above as a template using the primers slr2030-Fw (SEQ ID NO: 15) and slr2031-Rv (SEQ ID NO: 18) described in Table 1. The slr2030-2031:: slr1841_sgRNA was inserted to a pUC19 plasmid by use of In-Fusion PCR Cloning® to obtain a pUC19-slr1841_sgRNA plasmid.

The pUC19-slr1841_sgRNA plasmid was introduced to the *Synechocystis* dCas9 strain in the same manner as in the (1-1), and the transformed cells were selected on a BG-11 agar medium containing 30 μg/mL kanamycin. In this way, a transformant *Synechocystis* dCas9 slr1841_sgRNA strain having the insert of slr1841_sgRNA in the slr2030-slr2031 gene on the chromosomal DNA (hereinafter, also referred to as a slr1841-suppressed strain) was obtained.

(1-3) Suppression of slr1841 Gene

The promoter sequences of the dCas9 gene and the slr1841_sgRNA gene were designed such that expression was induced in the presence of anhydrotetracycline (aTc). In the present working examples, the expression of the slr1841 gene was suppressed by adding aTc (final concentration: 1 μg/mL) into the medium.

Working Example 2

In Example 2, a modified cyanobacterium in which the expression of slr0688 gene encoding a cell wall-pyruvic acid modifying enzyme was suppressed was obtained by the following procedures.

(2) Construction of Modified Cyanobacterium Strain in which Expression of Slr0688 Gene was Suppressed sgRNA gene containing a protospacer sequence (SEQ ID NO: 22) complementary to the slr0688 gene (SEQ ID NO: 4) was introduced to the *Synechocystis* dCas9 strain by the same procedures as in the (1-2) to obtain a *Synechocystis* dCas9 slr0688_sgRNA strain. The same conditions as in the (1-2) were used except that a set of the primers slr2030-Fw (SEQ ID NO: 15) and sgRNA_slr0688-Rv (SEQ ID NO: 19) and a set of the primers sgRNA_slr0688-Fw (SEQ ID NO: 20) and slr2031-Rv (SEQ ID NO: 18) described in Table 1 were used; and a DNA fragment (slr2030-2031:: slr0688_sgRNA) having (i) the slr2030 gene fragment, (ii) slr0688_sgRNA, (iii) kanamycin resistance marker gene, and (iv) the slr2031 gene fragment linked in order was inserted to a pUC19 plasmid by use of In-Fusion PCR Cloning® to obtain a pUC19-slr0688_sgRNA plasmid.

Further, the expression of the slr0688 gene was suppressed by the same procedures as in the (1-3).

Comparative Example 1

In Comparative Example 1, the *Synechocystis* dCas9 strain was obtained by the same procedures as in (1-1) of Example 1.

Subsequently, the state of cell surface was observed and a protein secretory productivity test was performed as to each of the bacterial strains obtained in Example 1, Example 2 and Comparative Example 1. Hereinafter, the details will be described.

(3) Observation of State of Cell Surface of Bacterial Strain

The respective ultrathin sections of the modified cyanobacterium *Synechocystis* dCas9 slr1841_sgRNA strain (i.e., a slr1841-suppressed strain) obtained in Example 1, the modified cyanobacterium *Synechocystis* dCas9 slr0688_sgRNA strain (hereinafter, also referred to as a slr0688-suppressed strain) obtained in Example 2, and the modified cyanobacterium *Synechocystis* dCas9 strain (hereinafter, referred to as a control strain) obtained in Comparative Example 1 were prepared, and the state of cell surface (in other words, an outer membrane structure) was observed under an electron microscope.

(3-1) Culture of Bacterial Strain

The slr1841-suppressed strain of Example 1 was inoculated at initial bacterial cell concentration OD730=0.05 to a BG-11 medium containing 1 μg/mL aTc and shake-cultured for 5 days under conditions of a light quantity of 100 μmol/m2/s and 30 °C. The slr0688-suppressed strain of Example 2 and the control strain of Comparative Example 1 were also cultured under the same conditions as in Example 1.

(3-2) Preparation of Ultrathin Section of Bacterial Strain

The culture solution obtained in the (3-1) was centrifuged at 2,500 g at room temperature for 10 minutes to retrieve the cells of the slr1841-suppressed strain of Example 1. Subsequently, the cells were rapidly frozen with liquid propane of −175 °C and then fixed at −80 °C for 2 days using an ethanol solution containing 2% glutaraldehyde and 1% tannic acid. The cells thus fixed were dehydrated with ethanol, and the dehydrated cells were impregnated with propylene oxide and then immersed in a resin (Quetol-651) solution. Then, the resin was cured by still standing at 60 °C for 48 hours to embed the cells in the resin. The cells in the resin were sliced into a thickness of 70 nm using an ultramicrotome (Ultracut) to prepare an ultrathin section. This ultrathin section was stained using 2% uranium acetate and 1% lead citrate solutions to provide a transmission electron microscopy sample of the slr1841-suppressed strain of Example 1. The slr0688-suppressed strain of Example 2 and the control strain of Comparative Example 1 were also each subjected to the same operation as above to provide transmission electron microscopy samples.

(3-3) Observation Under Electron Microscope

The ultrathin sections obtained in the (3-2) were observed under an accelerating voltage of 100 kV using a transmission electron microscope (JEOL JEM-1400Plus). The observation results are shown in FIGS. 3 to 8.

Figure 3:
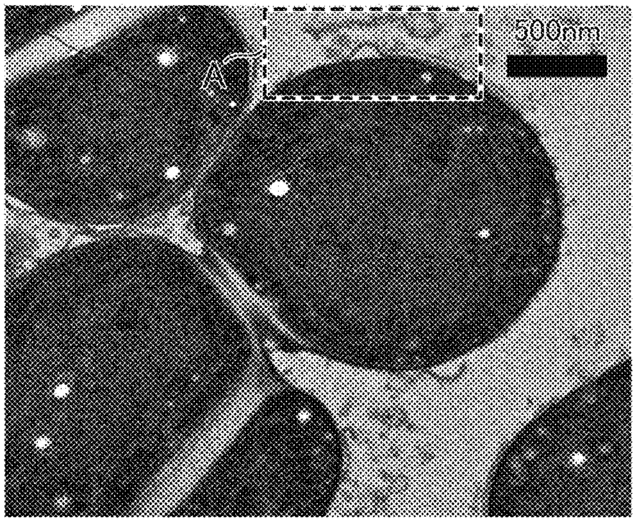
FIG. 3 is a transmission electron microscope image of an ultrathin section of a modified cyanobacterium of Example 1.
Figure 4:
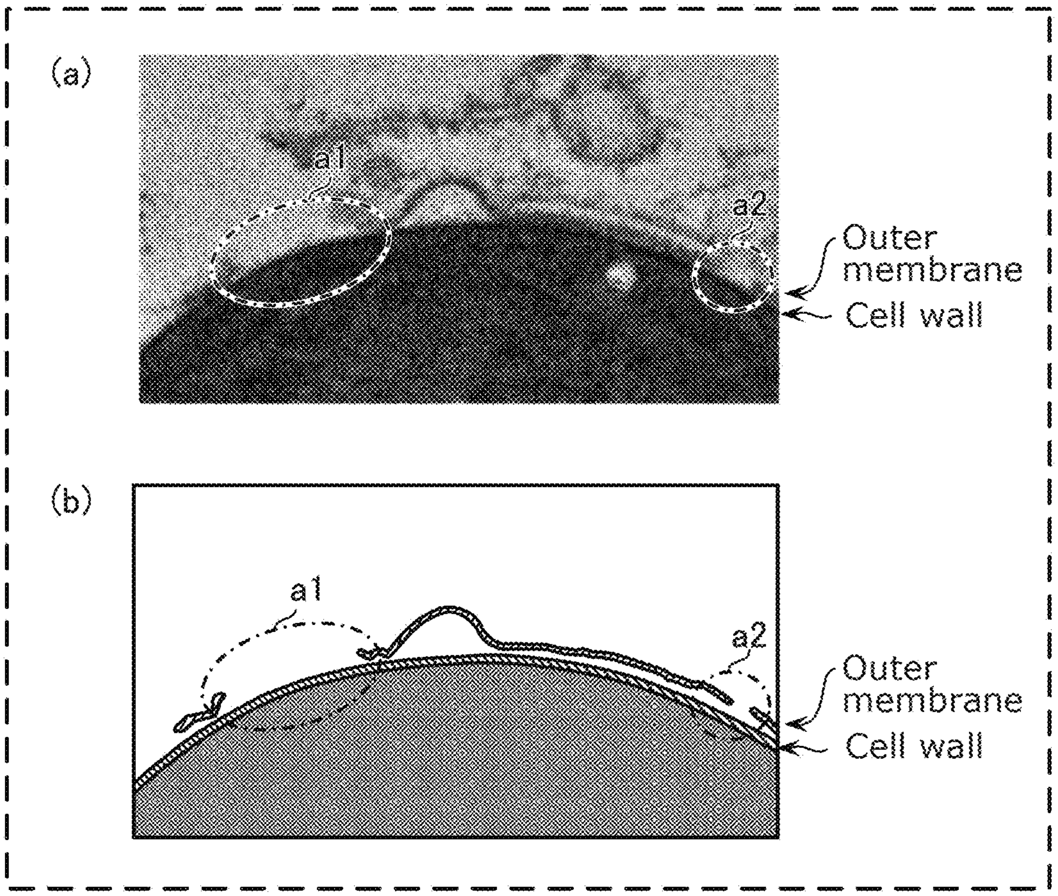
FIG. 4 is an enlarged image of broken line region A of FIG. 3.

First, the slr1841-suppressed strain of Example 1 will be described. FIG. 3 is a TEM (transmission electron microscope) image of the slr1841-suppressed strain of Example 1. FIG. 4 is an enlarged image of broken line region A of FIG. 3. (a) in FIG. 4 is an enlarged TEM image of broken line region A of FIG. 3, and (b) in FIG. 4 is a diagram graphically depicting the enlarged TEM image of (a) in FIG. 4.

As illustrated in FIG. 3, in the slr1841-suppressed strain of Example 1, the outer membrane was partially stripped (i.e., the outer membrane partially came off) from the cell wall while the outer membrane became partially loose.

In order to confirm the more detailed state of cell surface, broken line region A was subjected to magnifying observation. As a result, as illustrated in (a) and (b) of FIG. 4, sites where the outer membrane partially came off (dot-dash line regions a1 and a2 in the figures) were able to be confirmed. Also, a site where the outer membrane became largely loose was able to be confirmed near dot-dash line region a1. This site is a site having weakened binding between the outer membrane and the cell wall. It is considered that the outer membrane swelled outward and became loose because the culture solution infiltrated into the periplasm from the outer membrane.

Figure 5:
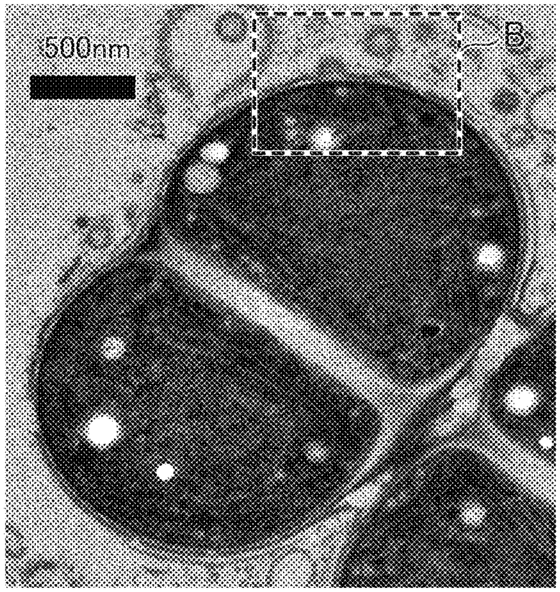
FIG. 5 is a transmission electron microscope image of an ultrathin section of a modified cyanobacterium of Example 2.
Figure 6:
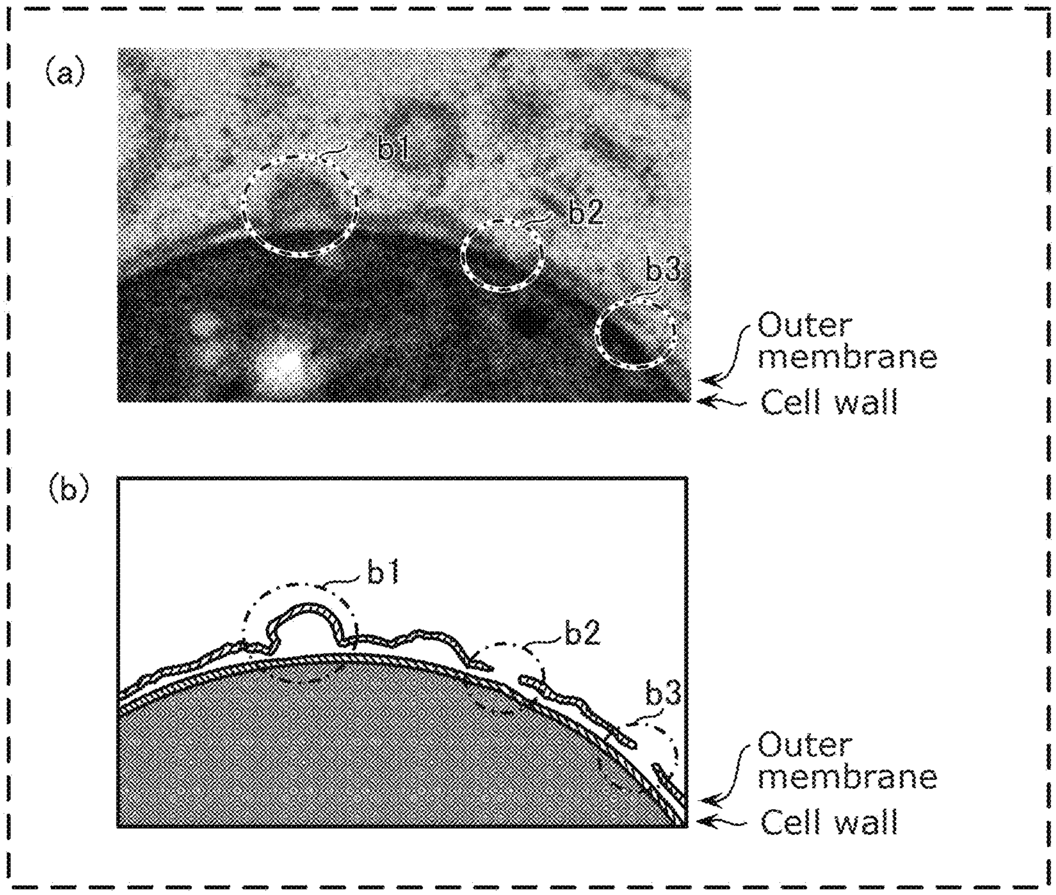
FIG. 6 is an enlarged image of broken line region B of FIG. 5

Subsequently, the slr0688-suppressed strain of Example 2 will be described. FIG. 5 is a TEM image of the slr0688-suppressed strain of Example 2. FIG. 6 is an enlarged image of broken line region B of FIG. 5. (a) in FIG. 6 is an enlarged TEM image of broken line region B of FIG. 5, and (b) in FIG. 6 is a diagram graphically depicting the enlarged TEM image of (a) in FIG. 6.

As illustrated in FIG. 5, in the slr0688-suppressed strain of Example 2, the outer membrane was partially stripped from the cell wall while the outer membrane partially became loose. In the slr0688-suppressed strain, it was able to be confirmed that the outer membrane was partially detached from the cell wall.

In order to confirm the more detailed state of cell surface, broken line region B was subjected to magnifying observation. As a result, as illustrated in (a) and (b) in FIG. 6, a site where the outer membrane became largely loose (dot-dash line region b1 in the figures) and sites where the outer membrane partially came off (dot-dash line regions b2 and b3 in the figures) were able to be confirmed. Also, a site where the outer membrane was detached from the cell wall was able to be confirmed near each of dot-dash line regions b1, b2, and b3.

Figure 7:
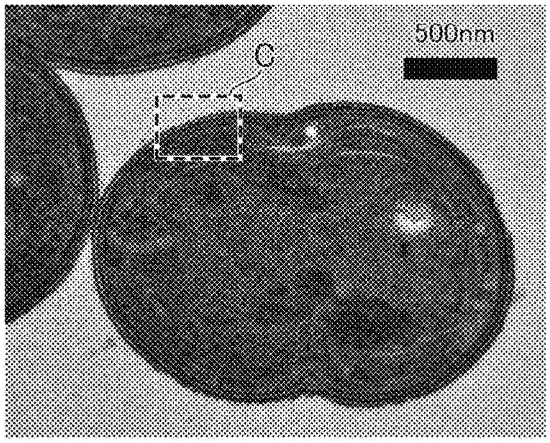
FIG. 7 is a transmission electron microscope image of an ultrathin section of a modified cyanobacterium of Comparative Example 1.
Figure 8:
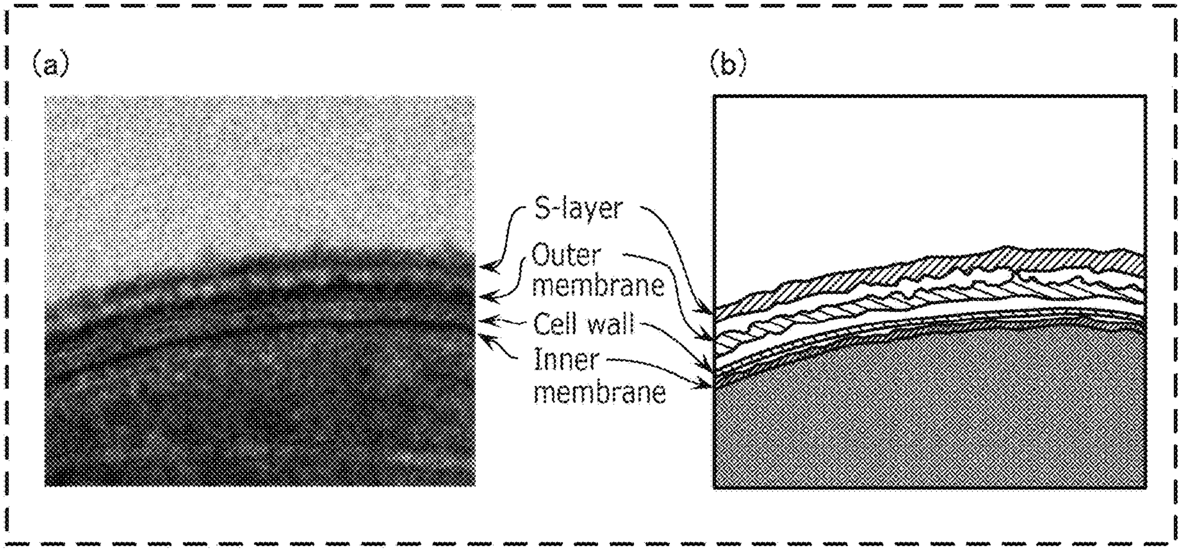
FIG. 8 is an enlarged view of broken line region C of FIG. 7.

Subsequently, the control strain of Comparative Example 1 will be described. FIG. 7 is a TEM image of the control strain of Comparative Example 1. FIG. 8 is an enlarged image of broken line region C of FIG. 7. (a) in FIG. 8 is an enlarged TEM image of broken line region C of FIG. 7, and (b) in FIG. 8 is a diagram graphically depicting the enlarged TEM image of (a) in FIG. 8.

As illustrated in FIG. 7, the control strain of Comparative Example 1 had ordered cell surface where the inner membrane, the cell wall, the outer membrane, and the S-layer were kept in a state layered in order. Specifically, the control strain exhibited none of the site where the outer membrane was detached from the cell wall, the site where the outer membrane was stripped (i.e., came off) from the cell wall, and the site where the outer membrane became loose, which were found in Examples 1 and 2.

(4) Protein Secretory Productivity Test

The slr1841-suppressed strain of Example 1, the slr0688-suppressed strain of Example 2, and the control strain of Comparative Example 1 were each cultured, and the amount of protein secreted to the outside of the cells (hereinafter, also referred to as the amount of secretory protein) was measured. Each of the bacterial strains described above was evaluated for the secretory productivity of protein from the amount of protein in the culture solution. The secretory productivity of protein refers to the ability to produce protein by secreting intracellularly produced protein to the outside of the cells. Hereinafter, a specific method will be described.

(4-1) Culture of Bacterial Strain

The slr1841-suppressed strain of Example 1 was cultured in the same manner as in the (3-1). The culture was performed three independent times. The bacterial strains of Example 2 and Comparative Example 1 were also cultured under the same conditions as in the bacterial strain of Example 1.

(4-2) Quantification of Protein Secreted to Outside of Cell

Each culture solution obtained in the (4-1) was centrifuged at 2,500 g at room temperature for 10 minutes to obtain a culture supernatant. The obtained culture supernatant was filtered through a membrane filter having a pore size of 0.22 μm to completely remove the cells of the slr1841-suppressed strain of Example 1. The amount of total protein contained in the culture supernatant thus filtered was quantified by the BCA (bicinchoninic acid) method. This series of operations was performed as to each of the three culture solutions obtained by culture performed three independent times to determine a mean and standard deviation of the amounts of protein secreted to the outside of the cells of the slr1841-suppressed strain of Example 1. The protein in the three culture solutions were also quantified under the same conditions as above as to each of the bacterial strains of Example 2 and Comparative Example 1, and a mean and standard deviation of the amounts of protein in the three culture solutions was determined.

Figure 9:
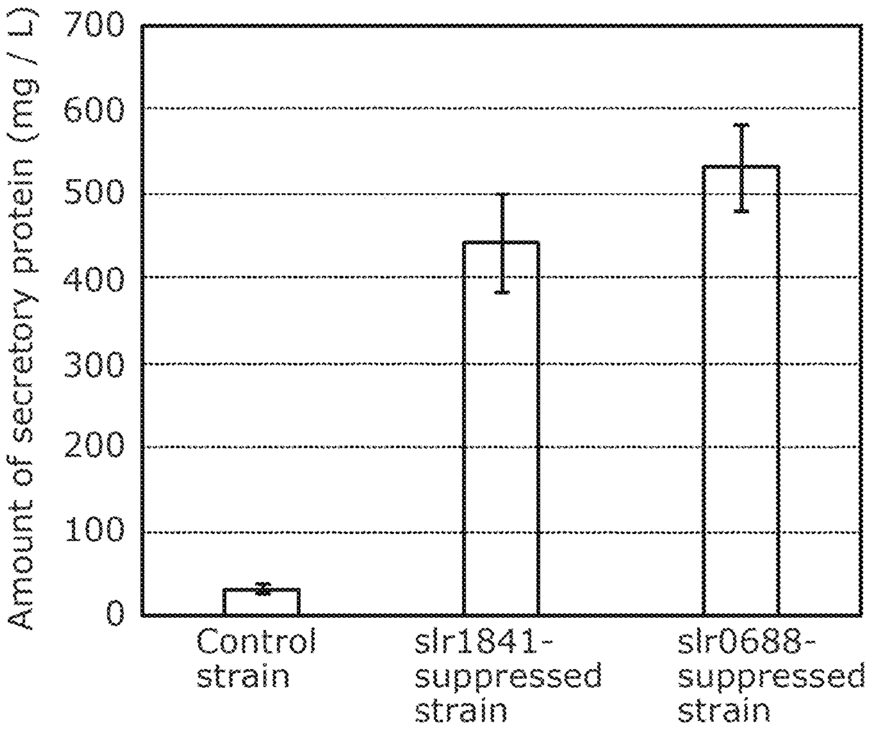
FIG. 9 is a graph illustrating the amount of protein (n=3, error bar=SD) in the culture supernatant of a modified cyanobacterium in Example 1, Example 2, and Comparative Example 1.

The results are shown in FIG. 9. FIG. 9 is a graph illustrating the amount of protein (n=3, error bar=SD) in the culture supernatant of a modified cyanobacterium in Example 1, Example 2, and Comparative Example 1.

As illustrated in FIG. 9, the amount (mg/L) of protein secreted into the culture supernatant was improved by approximately 25 times in all the slr1841-suppressed strain of Example 1 and the slr0688-suppressed strain of Example 2 compared with the control strain of Comparative Example 1.

Although the description of data is omitted, the absorbance (730 nm) of the culture solution was measured and the amount of secretory protein per g of bacterial cell dry weight (mg protein/g cell dry weight) was calculated. As a result, the amount of secretory protein per g of bacterial cell dry weight (mg protein/g cell dry weight) was improved by approximately 36 times in all the slr1841-suppressed strain of Example 1 and the slr0688-suppressed strain of Example 2 compared with the control strain of Comparative Example 1.

Furthermore, as illustrated in FIG. 9, the amount of protein secreted into the culture supernatant was larger for the slr0688-suppressed strain of Example 2 in which the expression of the gene encoding the cell wall-pyruvic acid modifying enzyme (slr0688) was suppressed than for the slr1841-suppressed strain of Example 1 in which the expression of the gene encoding the SLH domain-containing outer membrane protein (slr1841) was suppressed. This is probably related to a larger number of covalently linked sugar chains on cell wall surface than the number of the SLH domain-containing outer membrane protein (Slr1841) in the outer membrane. Specifically, the amount of protein secreted was increased from that for the slr1841-suppressed strain of Example 1 probably because the slr0688-suppressed strain of Example 2 had smaller binding level and binding force between the outer membrane and the cell wall than those of the slr1841-suppressed strain of Example 1.

From these results, it was able to be confirmed that a function of a protein related to binding between an outer membrane and a cell wall is suppressed, whereby the binding between the outer membrane and the cell wall of cyanobacterium is partially weakened so that the outer membrane is partially detached from the cell wall. It was also able to be confirmed that the weakened binding between the outer membrane and the cell wall facilitates leaking intracellularly produced protein of cyanobacterium to the outside of the cell. Thus, the modified cyanobacterium and the production method thereof according to the present embodiment was found to largely improve the secretory productivity of protein.

(5) Identification of Secreted Protein

Subsequently, the secreted protein contained in the culture supernatant obtained in the (4-2) was identified by LC-MS/MS. A method will be described below.

(5-1) Sample Preparation

Cold acetone was added in an amount of 8 times the fluid volume of the culture supernatant, and the mixture was left standing at 20 °C for 2 hours and then centrifuged at 20,000 g for 15 minutes to obtain a precipitate of the protein. To this precipitate, 100 mM Tris pH 8.5 and 0.5% sodium dodecanoate (SDoD) were added, and the protein was lysed with a closed sonicator. After adjustment of the protein concentration to 1 μg/mL, dithiothreitol (DTT) (final concentration: 10 mM) was added thereto, and the mixture was left standing at 50 °C for 30 minutes. Subsequently, iodoacetamide (IAA) (final concentration: 30 mM) was added thereto, and the mixture was left standing at room temperature (in the dark) for 30 minutes. In order to terminate the reaction of IAA, cysteine (final concentration: 60 mM) was added thereto, and the mixture was left standing at room temperature for 10 minutes. 400 ng of trypsin was added thereto, and the mixture was left standing overnight at 37 °C to convert the protein to peptide fragments. After addition of 5% TFA (trifluoroacetic acid), the mixture was centrifuged at 15,000 g at room temperature for 10 minutes to obtain a supernatant. By this operation, SDoD was removed. The sample was desalted using a C18 spin column and then dried with a centrifugal evaporator. Then, 3% acetonitrile and 0.1% formic acid were added thereto, and the sample was lysed using a closed sonicator. The peptide concentration was adjusted to 200 ng/μL.

(5-2) LC-MS/MS Analysis

The sample obtained in the (5-1) was analyzed using an LC-MS/MS apparatus (UltiMate 3000 RSLCnano LC System) under the following conditions.

Amount of sample injected: 200 ng

Column: CAPCELL CORE MP 75 μm×250 mm

Solvent: solvent A: 0.1% aqueous formic acid solution, solvent B: 0.1% formic acid+80% acetonitrile Gradient program: 8% solvent B 4 minutes after sample injection, 44% solvent B 27 minutes later, 80% solvent B 28 minutes later, and completion of measurement 34 minutes later.

(5-3) Data Analysis

The obtained data was analyzed under the following conditions to perform protein and peptide identification and the calculation of quantification values.

Software: Scaffold DIA

Database: UniProtKB/Swiss Prot database (*Synechocystis* sp. PCC 6803)

Fragmentation: HCD

Precursor Tolerance: 8 ppm

Fragment Tolerance: 10 ppm

Data Acquisition Type: Overlapping DIA

Peptide Length: 8-70

Peptide Charge: 2-8

Max Missed Cleavages: 1

Fixed Modification: Carbamidomethylation

Peptide FDR: 1% or less

Among the identified proteins, proteins predicted to have evident enzymatic activity among 30 types of proteins having the largest relative quantification values are described in Table 4.

All these 6 types of proteins were contained in each of the culture supernatants of the slr1841-suppressed strain of Example 1 and the slr0688-suppressed strain of Example 2. All of these proteins retained a periplasm (which refers to the space between the outer membrane and the inner membrane) localization signal. From these results, it was able to be confirmed that in the modified strains of Example 1 and Example 2, the outer membrane is partially detached from the cell wall, whereby protein in the periplasm easily leaks out to the outside of the outer membrane (i.e., to the outside of the bacterial cell). Thus, the modified cyanobacterium according to the present embodiment was found to have drastically improved secretory productivity of protein.

(6) Identification of Secreted Intracellular Metabolite (6-1) Sample Preparation 20 μl of an aqueous solution containing an internal standard with a concentration adjusted to 1,000 μM was added to 80 μl of the culture supernatant of the modified cyanobacterium, and the mixture was stirred, ultrafiltered, and then subjected to measurement.

(6-2) CE (Capillary Electrophoresis)-TOFMS (Time-of-Flight Mass Spectrometry) Analysis In this test, measurement in cationic and anionic modes was performed under the following conditions.

[Cationic Mode]

Apparatus: Agilent CE-TOFMS system

Capillary: Fused silica capillary i.d. 50 μm×80 cm

Measurement conditions:

Run buffer: Cation buffer solution (p/n: H3301-1001)

CE voltage: Positive, 30 kV

MS ionization: ESI positive

MS scan range: m/z 50-1,000

[Anionic Mode]

Apparatus: Agilent CE-TOFMS system

Capillary: Fused silica capillary i.d. 50 μm×80 cm

Measurement conditions:

Run buffer: Anion buffer solution (p/n: H3301-1001)

CE voltage: Positive, 30 kV

MS ionization: ESI negative

MS scan range: m/z 50-1,000

(6-3) Data Processing

Peaks with a signal/noise ratio of 3 or more were automatically detected as peaks detected in CE-TOFMS, using automatic integration software MasterHands® ver. 2.17.1.11. The detected peaks were checked against the values of all substances registered in the metabolite library of HMT (Human Metabolome Technologies Inc.), on the basis of the values of a mass-charge ratio (m/z) and a migration time inherent in each metabolite to search for metabolites contained in the culture supernatant of the modified cyanobacterium. Acceptable errors for search were +/−0.5 min in the migration time and +/−10 ppm in m/z. The concentration of each identified metabolite was calculated by single-point calibration of 100 μM. The identified major metabolites are described in Table 5.

TABLE 4

| | Protein name | Uniprot Accession ID | Gene name |
|---|---|---|---|
| 1 | Carboxyl-terminal protease | P73458 | prc |
| 2 | Iron uptake protein A2 | Q55835 | futA2 |
| 3 | Extracellular nuclease | P72938 | nucH |
| 4 | Alkaline phosphatase | P72939 | sll0654 |
| 5 | N-acetylmuramoyl-L-alanine amidase | P73736 | amiA |
| 6 | Peptidyl-prolyl cis-trans isomerase | P73037 | ytfC |

TABLE 5

| | | Concentration (μM) | |
|---|---|---|---|
| | Metabolite name | slr1841-suppressed strain | slr0688-suppressed strain |
| 1 | 3-hydroxybutyric acid | 1.3 | 1.2 |
| 2 | adenosine | 0.8 | 0.6 |
| 3 | aspartic acid | 4.6 | 3.0 |
| 4 | cytidine | 0.7 | 0.5 |
| 5 | guanosine | 1.5 | 1.1 |

TABLE 5-continued

| | Metabolite name | Concentration (μM) slr1841-suppressed strain | slr0688-suppressed strain |
|---|---|---|---|
| 6 | Gluconic acid | 2.7 | 3.9 |
| 7 | Glutathione(GSSG) | 0.4 | 0.4 |
| 8 | Lactic acid | 3.2 | 4.7 |
| 9 | Malic acid | 1.4 | 2.8 |
| 10 | p-aminobeizoic acid | 1.7 | 0.9 |
| 11 | S-adenosylmethionine | 0.2 | 0.1 |
| 12 | spermidine | 4.2 | 3.0 |

All of these 12 types of intracellular metabolites were contained in each of the culture supernatants of the slr1841-suppressed strain of Example 1 and the slr0688-suppressed strain of Example 2. None of these metabolites were contained in the culture supernatant of the control strain of Comparative Example 1, though data is not described herein. From these results, it was able to be confirmed that in the modified strains of Example 1 and Example 2, the outer membrane is partially detached from the cell wall, whereby intracellular metabolites easily leak out to the outside of the outer membrane (i.e., to the outside of the bacterial cell).

(7) Plant Cultivation Test

Subsequently, in order to evaluate the plant growth promoting effect of the secretion of the modified cyanobacterium (here, the culture supernatant of the modified cyanobacterium), the following plant cultivation tests were carried out. Specifically, a spinach cultivation test was carried out to evaluate its effect on vegetative growth. Also, a petunia cultivation test was carried out to evaluate its effect on reproductive growth. Further, tomato, strawberry, and lettuce cultivation tests were conducted to evaluate its effect on the growth of fruiting plants and hydroponically cultivated plants. Hereinafter, each of these cultivation tests will be described.

(7-1) Spinach Cultivation Test

In the spinach cultivation test, the plant growth promoting effect of the modified cyanobacterium secretion on vegetative growth by which plants formed only vegetative organs such as stems, leaves, and roots was evaluated by Example 3 and Comparative Examples 2 to 7 given below.

First, commercially available culture soil was placed in pots for cultivation (12 cm×10 cm), and three seeds of spinach were sowed per pot. Cultivation was performed at a temperature of 23 °C inside the room for 40 days under 10-hour light and 14-hour dark conditions using a white light source with a photon flux density of 100 $\mu mol/m^2/s$. During this period, each pot was fed with 50 mL of distilled water every alternate day. Approximately 1 week after the start of cultivation, seedlings were thinned out at the cotyledonary stage to equalize individual sizes among the pots.

Example 3

After equalization of individual sizes among the pots as described above, the culture supernatant of the modified cyanobacterium (hereinafter, referred to as the secretion of the modified cyanobacterium) was added at 5 mL per plant to the base of spinach once a week. After cultivation for 40 days, spinach was harvested, and the total leaf length and the dry weight of shoot were measured. The total leaf length is the total value of lengths including blade and petiole lengths in all the leaves. The dry weight of shoot is the dry weight of a leaf stem part exposed above the ground. The modified cyanobacterium was the slr1841-suppressed strain of Example 1 and the slr0688-suppressed strain of Example 2, and the culture supernatant of the modified cyanobacterium of each of Example 1 and Example 2 was used in Example 3. The total leaf length and the dry weight of shoot were measured as to the spinach in each of 13 pots thus cultivated for 40 days, and a mean and standard deviation (SD) thereof were determined.

Comparative Example 2

The operation was performed in the same manner as in Example 3 except that water was used instead of the secretion of the modified cyanobacterium. The total leaf length and the dry weight of shoot were measured as to the spinach in each of 13 pots thus cultivated for 40 days, and a mean and standard deviation (SD) thereof were determined.

Comparative Example 3

The operation was performed in the same manner as in Example 3 except that medium BG-11 for cyanobacterium was used instead of the secretion of the modified cyanobacterium. The total leaf length and the dry weight of shoot were measured as to the spinach in each of 6 pots thus cultivated for 40 days, and a mean and standard deviation (SD) thereof were determined.

Comparative Example 4

The operation was performed in the same manner as in Example 3 except that the culture supernatant of the parent cyanobacterium (*Synechocystis* sp. PCC 6803) was used instead of the secretion of the modified cyanobacterium. The total leaf length and the dry weight of shoot were measured as to the spinach in each of 4 pots thus cultivated for 40 days, and a mean and standard deviation (SD) thereof were determined.

Comparative Example 5

The operation was performed in the same manner as in Example 3 except that distilled water containing 100 ppm of cell extracts (hot water extraction) of the parent cyanobacterium (*Synechocystis* sp. PCC 6803) prepared according to the disclosure of PTL 5 (hereinafter, referred to as the hot water extracts of the parent cyanobacterium) was used instead of the secretion of the modified cyanobacterium. The total leaf length and the dry weight of shoot were measured as to the spinach in each of 5 pots thus cultivated for 40 days, and a mean and standard deviation (SD) thereof were determined.

Comparative Example 6

The operation was performed in the same manner as in Example 3 except that a chemical fertilizer (500-fold dilution of a stock solution containing 6% of total nitrogen, 10% of water-soluble phosphoric acid, 5% of water-soluble potassium, 0.05% of water-soluble magnesium, 0.001% of water-soluble manganese, and 0.005% of water-soluble boron) was used instead of the secretion of the modified cyanobacterium. The total leaf length and the dry weight of shoot were measured as to the spinach in each of 6 pots thus cultivated for 40 days, and a mean and standard deviation (SD) thereof were determined.

Comparative Example 7

The operation was performed in the same manner as in Example 3 except that an organic fertilizer (animal waste manure; 500-fold dilution of a stock solution containing a plant fermentation product) was used instead of the secretion of the modified cyanobacterium. The total leaf length and the dry weight of shoot were measured as to the spinach in each of 6 pots thus cultivated for 40 days, and a mean and standard deviation (SD) thereof were determined.

(Results)

The results of Example 3 and Comparative Examples 2 to 7 are illustrated in FIG. 10. FIG. 10 is a diagram illustrating the results of the spinach cultivation test.

The total leaf length and the dry weight of shoot illustrated in FIG. 10 are values normalized when the numerical values (mean+/−SD) of the total leaf length and the dry weight of shoot of spinach obtained in Comparative Example 2 (added component in the figure: water) are each defined as 1. In FIG. 10, the photographs of the respective typical individuals of Example 3 and Comparative Examples 2 to 7 are provided in order to visually illustrate difference in growth states such as leaf attitude and stem thickness.

(1) First, the results about the total leaf length will be described.

Individuals having the total leaf length equivalent to that of Comparative Example 2 (water) were the individuals of Comparative Example 3 (medium for cyanobacterium) and Comparative Example 6 (chemical fertilizer).

Individuals having the total leaf length that fell below that of Comparative Example 2 (water) were the individuals of Comparative Example 4 (culture solution of the parent cyanobacterium) and Comparative Example 7 (organic fertilizer).

Individuals having the total leaf length that exceeded that of Comparative Example 2 (water) were the individuals of Comparative Example 5 (hot water extracts of the parent cyanobacterium) and Example 3 (secretion of the modified cyanobacterium). More specifically, Comparative Example 5 (hot water extracts of the parent cyanobacterium) had approximately 1.1 times the total leaf length of Comparative Example 2 (water), whereas Example 3 (secretion of the modified cyanobacterium) had approximately 1.3 times the total leaf length of Comparative Example 2 (water). In short, the individuals of Example 3 given the modified cyanobacterium secretion exhibited a marked growing effect as compared with the individuals of Comparative Example 5 given the hot water extracts of the parent cyanobacterium.

(2) Subsequently, the results about the dry weight of shoot will be described.

Individuals having the dry weight of shoot equivalent to that of Comparative Example 2 (water) were the individuals of Comparative Example 7 (organic fertilizer).

Individuals having the dry weight of shoot that fell below that of Comparative Example 2 (water) were the individuals of Comparative Example 3 (medium for cyanobacterium), Comparative Example 4 (culture solution of the parent cyanobacterium), and Comparative Example 5 (hot water extracts of the parent cyanobacterium).

Individuals having the dry weight of shoot that exceeded that of Comparative Example 2 (water) were the individuals of Comparative Example 6 (chemical fertilizer) and Example 3 (secretion of the modified cyanobacterium). More specifically, Comparative Example 6 (chemical fertilizer) had approximately 1.1 times the dry weight of shoot of Comparative Example 2 (water), whereas Example 3 (secretion of the modified cyanobacterium) had approximately 1.5 times the dry weight of shoot of Comparative Example 2 (water). In short, the individuals of Example 3 given the modified cyanobacterium secretion exhibited a marked weight gaining effect as compared with the individuals of Comparative Example 6 given the chemical fertilizer.

Subsequently, the results of comparing the growth states of the individuals will be described.

The individuals of Comparative Example 4 given the culture solution of the parent cyanobacterium had a poorer growth state than that of the individuals of Comparative Example 3 given the medium for cyanobacterium. When the photographs of their typical individuals were compared, the individual of Comparative Example 4 had thinner stems and poorer firmness in its stems and leaves as a whole than those of the individual of Comparative Example 3.

The individuals of Comparative Example 5 given the hot water extracts of the parent cyanobacterium had a better growth state than that of the individuals of Comparative Example 4 given the culture solution of the parent cyanobacterium. When the photographs of their typical individuals were compared, the individual of Comparative Example 5 had thicker stems, thicker leaves, and better firmness in its stems and leaves as a whole than those of the individual of Comparative Example 4. These results suggest that a substance related to promoting growth of a plant was produced within the bacterial cell of the parent cyanobacterium and the substance leaked out to the outside of the bacterial cell by the treatment of the bacterial cell of the parent cyanobacterium with hot water and participated in promoting growth of spinach.

The individuals of Example 3 given the modified cyanobacterium secretion had a better growth state than that of the individuals of Comparative Example 5 given the hot water extracts of the parent cyanobacterium. When the photographs of their typical individuals were compared, the individual of Example 3 had thicker stems, thicker leaves, a larger number of leaves, and better firmness in its stems and leaves as a whole than those of the individual of Comparative Example 5. More specifically, the individuals of Example 3 had approximately 1.2 times the total leaf length and approximately 1.6 times the dry weight of shoot of the individuals of Comparative Example 5. These results suggest that substances produced within the bacterial cells of both the parent cyanobacterium and the modified cyanobacterium included substances, for example, protein, which are denatured by heat so as to easily lose their functions.

The individuals of Example 3 given the modified cyanobacterium secretion had a better growth state than that of the individuals of Comparative Example 6 given the chemical fertilizer (6% of total nitrogen, 10% of water-soluble phosphoric acid, 5% of water-soluble potassium). When the photographs of their typical individuals were compared, the individual of Example 3 had thicker stems, thicker leaves, a larger number of leaves, and better firmness in its stems and leaves as a whole than those of the individual of Comparative Example 6. These results suggest that a substance contained in the modified cyanobacterium secretion was involved in promoting growth of spinach.

The individuals of Example 3 given the modified cyanobacterium secretion had a better growth state than that of the individuals of Comparative Example 7 given the organic fertilizer (animal waste manure containing a plant fermentation product). When the photographs of their typical individuals were compared, the individual of Example 3 had thicker stems, thicker leaves, a larger number of leaves, and better firmness in its stems and leaves as a whole than those of the individual of Comparative Example 7. These results suggest that a substance contained in the modified cyanobacterium secretion was involved in promoting growth of spinach.

These results demonstrated that the secretion of the modified cyanobacterium contains a plurality of substances involved in promoting growth of a plant (here, spinach) and these substances include a substance that is deactivated by heat. The culture supernatant of the modified cyanobacterium exhibited a plant growth promoting effect, whereas the culture solution of the parent cyanobacterium did not exhibit this effect, demonstrating that the substances involved in promoting growth of a plant are secreted to the outside of the bacterial cell and thereby act on promoting growth of a plant. Thus, for promoting growth of a plant, it is presumably necessary for the secretion to come into contact with soil or the plant itself and exert some physiological activity. In fact, the plant growth promoting effect was largely impaired in the extracts of the parent cyanobacterium if an approach that caused denaturation of biogenic substances, such as hot water extraction, was used in the process, also suggesting that some physiological activity is necessary for the plant growth promoting effect.

(7-2) Petunia Cultivation Test

In the petunia cultivation test, the plant growth promoting effect of the modified cyanobacterium secretion on reproductive growth by which plants formed flower buds, flowered, fruited, and produced seeds was evaluated by Example 4 and Comparative Example 8 given below.

First, commercially available culture soil was placed in pots for cultivation (12 cm×10 cm), and three seeds of petunia were sowed per pot. Cultivation was performed at a temperature of 23 °C inside the room for 60 days under 16-hour light and 8-hour dark conditions using a white light source with a photon flux density of 200 $\mu mol/m^2/s$. During this period, each pot was fed with 50 mL of distilled water every alternate day. Approximately 1 week after the start of cultivation, seedlings were thinned out at the cotyledonary stage to equalize individual sizes among the pots.

Example 4

After equalization of individual sizes among the pots as described above, the modified cyanobacterium secretion was added at 5 mL per plant to the base of petunia once a week. The modified cyanobacterium secretion was the culture supernatant of the slr0688-suppressed strain of Example 2. The numbers of flowers and buds were counted as to the petunia in each of 3 pots thus cultivated for 40 days and 60 days, and a mean and standard deviation (SD) thereof were determined.

Comparative Example 8

The chemical fertilizer (diluted 500-fold) used in Comparative Example 6 described above was added at 50 mL per plant to the base of petunia once two weeks. The numbers of flowers and buds were counted as to the petunia in each of 3 pots thus cultivated for 40 days and 60 days, and a mean and standard deviation (SD) thereof were determined.

(Results)

The results of Example 4 and Comparative Example 8 are illustrated in FIG. 11. FIG. 11 is a diagram illustrating the results of the petunia cultivation test. In FIG. 11, the photographs of typical individuals are provided, and the number of flowers and the number of buds (mean+/−SD) are illustrated.

(1) First, results of comparing growth states after cultivation for 40 days in Example 4 and Comparative Example 8 will be described.

The number of flowers after cultivation for 40 days was 6.3+/−2.5 (n=3) in the individuals of Example 4, whereas the number of flowers was 0 (n=3) in the individuals of Comparative Example 8. The number of buds was 8.7+/−3.1 (n=3) in the individuals of Example 4, whereas the number of buds was 2.7+/−3.8 (n=3) in the individuals of Comparative Example 8. In short, the individuals of Example 4 cultivated for 40 days had approximately 3 times the number of buds in the individuals of Comparative Example 8. When the photographs of their typical individuals were compared, it can be confirmed that the growth of the individual of Example 4 was more promoted than that of the individual of Comparative Example 8. More specifically, 12 flowers and 4 buds can be confirmed in the individual of Example 4, whereas 0 flowers and only one bud can be confirmed in the individual of Comparative Example 8. These results suggest that a substance contained in the modified cyanobacterium secretion is involved in promoting growth of petunia.

(2) Subsequently, results of comparing growth states after cultivation for 60 days in Example 4 and Comparative Example 8 will be described.

The number of flowers after cultivation for 60 days was 17.3+/−3.1 (n=3) in the individuals of Example 4, whereas the number of flowers was 5.7+/−5.1 (n=3) in the individuals of Comparative Example 8. In short, the individuals of Example 4 cultivated for 60 days had approximately 3 times the number of flowers in the individuals of Comparative Example 8. The number of buds was 17.6+/−3.8 (n=3) in the individuals of Example 4, whereas the number of buds was 11.7+/−3.1 (n=3) in the individuals of Comparative Example 8. In short, the individuals of Example 4 cultivated for 60 days had approximately 1.5 times the number of buds in the individuals of Comparative Example 8. When the photographs of their typical individuals were compared, it can be confirmed that the growth of the individual of Example 4 was more promoted than that of the individual of Comparative Example 8. More specifically, 24 flowers and 18 buds can be confirmed in the individual of Example 4, whereas only 6 flowers and 11 buds can be confirmed in the individual of Comparative Example 8. These results suggest that a substance contained in the modified cyanobacterium secretion is involved in promoting growth of petunia.

(3) Subsequently, changes in the respective growth states of Example 4 and Comparative Example 8 will be described.

In the individuals of Example 4, the number of flowers after cultivation for 60 days was increased to approximately 3 times the number of flowers after cultivation for 40 days, and the number of buds after cultivation for 60 days was increased to approximately 2 times the number of buds after cultivation for 40 days.

On the other hand, in the individuals of Comparative Example 8, the number of flowers after cultivation 60 days was increased to 5.7+/−5.1 (n=3) from 0 flowers after cultivation for 40 days, and the number of buds after cultivation for 60 days was increased to approximately 4 times the number of buds after cultivation for 40 days.

The individuals of Comparative Example 8 took a longer time to form flower buds than that of the individuals of Example 3. In short, the individuals of Comparative Example 8 took a long time for vegetative growth, and their reproductive growth started at a late timing, presumably because the growth of the individuals of Comparative Example 8 was not promoted as much as the growth of the individuals of Example 3 was promoted.

The individuals of Example 4 given the modified cyanobacterium secretion exhibited markedly promoted flowering as compared with the individuals of Comparative Example 8 given the chemical fertilizer. It was therefore able to be confirmed that the secretion contained a substance involved in promoting growth of a plant.

(7-3) Tomato Cultivation Test

First, commercially available culture soil was placed in planters for cultivation (22 cm×16 cm), and three seeds of tomato were sowed per planter. Cultivation was performed at a temperature of 23 °C inside the room for 150 days under 16-hour light and 8-hour dark conditions using a white light source with a photon flux density of 250 μmol/m$^2$/s. During this period, each planter was fed with 500 mL of distilled water every three days. Approximately 1 week after the start of cultivation, seedlings were thinned out at the cotyledonary stage to equalize individual sizes among the planters. Also, a commercially available chemical fertilizer (500-fold dilution of a stock solution containing 6% of total nitrogen, 10% of water-soluble phosphoric acid, 5% of water-soluble potassium, 0.05% of water-soluble magnesium, 0.001% of water-soluble manganese, and 0.005% of water-soluble boron) was applied at 500 mL per planter once 50 days.

Example 5

After equalization of individual sizes among the planters as described above, the secretion of the modified cyanobacterium was added at 5 mL per plant to the base of the plant once a week. During cultivation for 150 days, tomato whose fruit ripened and turned red was harvested in order, and the cumulative total number of harvests (also referred to as the number of fruits) up to the harvest date was recorded. The weights of the harvested fruits were measured, and a mean and standard deviation (SD) were determined. The modified cyanobacterium was the slr1841-suppressed strain of Example 1 and the slr0688-suppressed strain of Example 2.

Comparative Example 9

The operation was performed in the same manner as in Example 5 except that water was used instead of the secretion of the modified cyanobacterium.

(Results)

Figure 12:
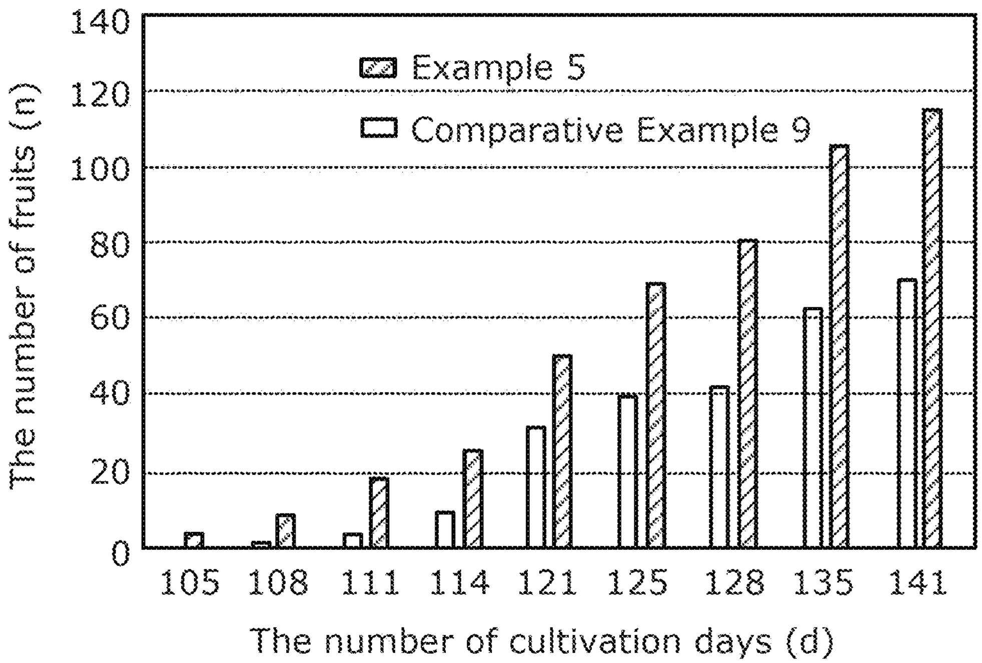
FIG. 12 is a diagram illustrating results of a tomato cultivation test.
Figure 13:
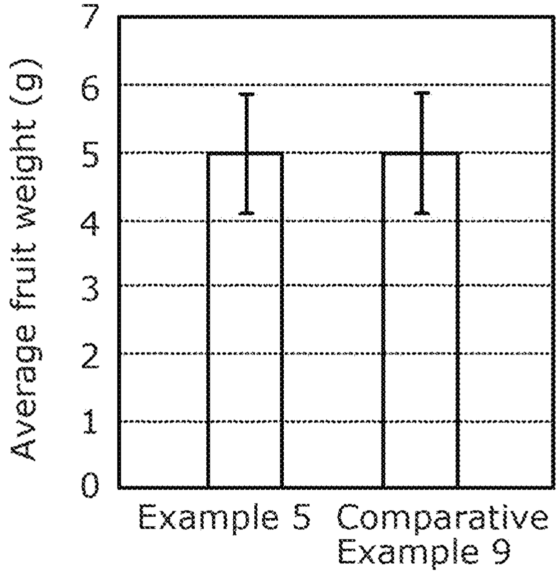
FIG. 13 is a diagram illustrating results of a tomato cultivation test.

The results of Example 5 and Comparative Example 9 are illustrated in FIGS. 12 and 13. Each of FIGS. 12 and 13 is a diagram illustrating the results of the tomato cultivation test.

As illustrated in FIG. 12, the fruit harvest time of the plants cultivated in Example 5 was earlier than that of the plants cultivated in Comparative Example 9. Furthermore, the number of fruits harvested in Example 5 was increased by approximately 67% as compared with the number of fruits harvested in Comparative Example 9.

As illustrated in FIG. 13, the average weight per fruit harvested was almost the same between Example 5 and Comparative Example 9.

(7-4) Strawberry Cultivation Test

Approximately 7 cm long strawberry seedlings having approximately 9 leaves were settled-planted in pots for cultivation (12 cm×10 cm) containing commercially available culture soil. Cultivation was performed at temperatures of 20 °C for the light period and 15 °C for the dark period for 150 days under 14-hour light and 10-hour dark conditions using a white light source with a photon flux density of 200 μmol/m$^2$/s. During this period, each pot was fed with 50 mL of distilled water every alternate day. Also, a commercially available chemical fertilizer (500-fold dilution of a stock solution containing 6% of total nitrogen, 10% of water-soluble phosphoric acid, 5% of water-soluble potassium, 0.05% of water-soluble magnesium, 0.001% of water-soluble manganese, and 0.005% of water-soluble boron) was applied at 100 mL per pot once 50 days.

Example 6

During the cultivation period described above, the secretion of the modified cyanobacterium was added at 5 mL per plant to the base of the plant once a week. Strawberry whose fruit ripened and turned red was harvested in order, and the cumulative total number of harvests (i.e., the number of fruits) up to the harvest date was recorded. The weights of the harvested fruits were measured, and a mean and standard deviation (SD) were determined. The modified cyanobacterium was the slr1841-suppressed strain of Example 1 and the slr0688-suppressed strain of Example 2.

Comparative Example 10

The operation was performed in the same manner as in Example 6 except that water was used instead of the secretion of the modified cyanobacterium.

(Results)

The results of Example 6 and Comparative Example 10 are illustrated in FIGS. 14 to 16. Each of FIGS. 14 to 16 is a diagram illustrating the results of the strawberry cultivation test. In FIG. 15, the photographs on 110 days after settled-planting of the seedlings of the plants cultivated in Example 6 and Comparative Example 10 are provided in order to visually illustrate difference in growth states such as fruit and flower attitudes.

As illustrated in FIG. 14, the fruit harvest time of the plants cultivated in Example 6 was earlier than that of the plants cultivated in Comparative Example 10. Furthermore, the number of fruits harvested in Example 6 was increased by approximately 47% as compared with the number of fruits harvested in Comparative Example 10.

As illustrated in FIG. 15, the plants cultivated in Example 6 had denser leaves, larger numbers of flowers, buds, and fruits, and better growth than those of the plants cultivated in Comparative Example 10.

As illustrated in FIG. 16, the average weight per fruit harvested had no significant change between Example 6 and Comparative Example 10.

(7-5) Hydroponic Lettuce Cultivation Test

The hydroponic culture solution used was a 500-fold dilution of a stock solution of a commercially available culture solution containing 6% of total nitrogen, 10% of water-soluble phosphoric acid, 5% of water-soluble potassium, 0.05% of water-soluble magnesium, 0.001% of water-soluble manganese, and 0.005% of water-soluble boron. Cultivation was performed at room temperature (22 °C) for 35 days under 16-hour light and 8-hour dark conditions using a white light source with a photon flux density of 200 μmol/m$^2$/s as a light condition.

Example 7

During the cultivation period described above, the secretion of the modified cyanobacterium was added in a quantity of 5 mL per plant to the hydroponic culture solution once a week. After harvesting, plant weights were measured, and a mean and standard deviation (SD) were determined. The modified cyanobacterium was the slr1841-suppressed strain of Example 1 and the slr0688-suppressed strain of Example 2.

Comparative Example 11

The operation was performed in the same manner as in Example 7 except that water was used instead of the secretion of the modified cyanobacterium.

(Results)

Figure 18:
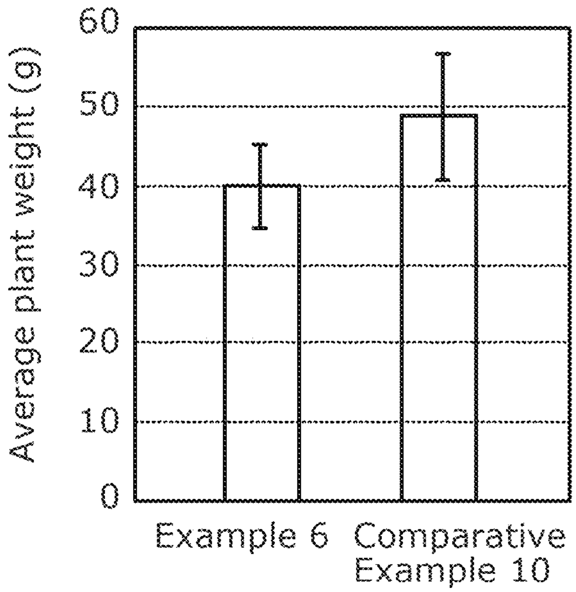
FIG. 18 is a diagram illustrating results of a hydroponic lettuce cultivation test.

The results of Example 7 and Comparative Example 11 are illustrated in FIGS. 17 and 18. Each of FIGS. 17 and 18 is a diagram illustrating the results of the hydroponic lettuce cultivation test. In FIG. 17, the photographs after cultivation for 34 days of the plants cultivated in Example 7 and Comparative Example 11 are provided in order to visually illustrate difference in growth states such as leaf attitude.

As illustrated in FIG. 17, the plants cultivated in Example 7 had a larger number of leaves and better growth than those of the plants cultivated in Comparative Example 11.

As illustrated in FIG. 18, the average weight of the plants harvested in Example 7 was increased by approximately 21% as compared with that of the plants harvested in Comparative Example 11.

CONCLUSION

From the results of the spinach cultivation test and the petunia cultivation test, the plant growth promoter according to the present embodiment was able to be confirmed to have a higher plant growth promoting effect than that of conventional plant growth promoters (e.g., chemical fertilizers, organic fertilizers, and hot water extracts of parent cyanobacterium).

From the results of the tomato cultivation test and the strawberry cultivation test, the addition of the plant growth promoter according to the present embodiment in addition to a conventional plant growth promoter (e.g., a chemical fertilizer) to fruiting plants was able to be confirmed to produce a high plant growth promoting effect.

From the results of the hydroponic lettuce cultivation test, the plant growth promoter according to the present embodiment was able to be confirmed to have a high plant growth promoting effect not only on plants cultivated in soil but on hydroponically cultivated plants.

INDUSTRIAL APPLICABILITY

The present disclosure can provide a modified cyanobacterium having improved secretory productivity of a plant growth promoting substance. The substance can be efficiently produced by culturing the modified cyanobacterium of the present disclosure. For example, the addition of the substance to soil can promote plant growth and can be expected to increase the amount of crops harvested.

The invention claimed is:

1. A plant growth promoter comprising:

a secretion of a modified cyanobacterium in which a function of a protein involved in binding between an outer membrane and a cell wall of cyanobacterium is lost, wherein the protein involved in the binding between the outer membrane and the cell wall is at least one of a surface layer homology (SLH) domain-containing outer membrane protein or a cell wall-pyruvic acid modifying enzyme, the SLH domain-containing outer membrane protein is:

Slr1841 having an amino acid sequence represented by SEQ ID NO: 1;

NIES970_09470 having an amino acid sequence represented by SEQ ID NO: 2;

Anacy_3458 having an amino acid sequence represented by SEQ ID NO: 3, and the cell wall-pyruvic acid modifying enzyme is:

Slr0688 having an amino acid sequence represented by SEQ ID NO: 4;

Synpcc7942_1529 having an amino acid sequence represented by SEQ ID NO: 5;

Anacy_1623 having an amino acid sequence represented by SEQ ID NO: 6.

2. A plant growth promoter comprising:

a secretion of a modified cyanobacterium in which a function of a protein involved in binding between an outer membrane and a cell wall of cyanobacterium is suppressed or lost, wherein a gene which causes expression of the protein involved in the binding between the outer membrane and the cell wall is deleted or inactivated, the gene which causes expression of the protein involved in the binding between the outer membrane and the cell wall is at least one of a gene encoding an SLH domain-containing outer membrane protein or a gene encoding a cell wall-pyruvic acid modifying enzyme, the gene encoding the SLH domain-containing outer membrane protein is:

slr1841 having a nucleotide sequence represented by SEQ ID NO: 7;

nies970_09470 having a nucleotide sequence represented by SEQ ID NO: 8;

anacy_3458 having a nucleotide sequence represented by SEQ ID NO: 9, and the gene encoding the cell wall-pyruvic acid modifying enzyme is:

slr0688 having a nucleotide sequence represented by SEQ ID NO: 10;

synpcc7942_1529 having a nucleotide sequence represented by SEQ ID NO: 11;

anacy_1623 having a nucleotide sequence represented by SEQ ID NO: 12.

* * * * *